US010187610B2

(12) United States Patent
Wang et al.

(10) Patent No.: US 10,187,610 B2
(45) Date of Patent: Jan. 22, 2019

(54) CONTROLLING DISPLAY BASED ON AN OBJECT POSITION IN AN IMAGING SPACE

(71) Applicant: SONY CORPORATION, Tokyo (JP)

(72) Inventors: QiHong Wang, Tokyo (JP); Kenichi Okada, Tokyo (JP); Ken Miyashita, Tokyo (JP); Akemi Tazaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 513 days.

(21) Appl. No.: 14/436,472

(22) PCT Filed: Sep. 6, 2013

(86) PCT No.: PCT/JP2013/005296
§ 371 (c)(1),
(2) Date: Apr. 16, 2015

(87) PCT Pub. No.: WO2014/064878
PCT Pub. Date: May 1, 2014

(65) Prior Publication Data
US 2015/0326830 A1 Nov. 12, 2015

(30) Foreign Application Priority Data

Oct. 23, 2012 (JP) ................................. 2012-233621

(51) Int. Cl.
G06T 7/70 (2017.01)
H04N 7/18 (2006.01)
(Continued)

(52) U.S. Cl.
CPC ............. H04N 7/181 (2013.01); G06T 7/292 (2017.01); G06T 7/70 (2017.01);
(Continued)

(58) Field of Classification Search
None
See application file for complete search history.

(56) References Cited

U.S. PATENT DOCUMENTS 6,359,647 B1 * 3/2002 Sengupta ......... G08B 13/19608
348/154
7,095,450 B1 * 8/2006 Holmes ................... A63F 13/12
345/629

(Continued)

FOREIGN PATENT DOCUMENTS

JP 2005-012415 A 1/2005
JP 2006-121580 A 5/2006
(Continued)

Primary Examiner — William C Vaughn, Jr.
Assistant Examiner — Lindsay J Uhl
(74) Attorney, Agent, or Firm — Chip Law Group

(57) ABSTRACT

An information processing apparatus according to an embodiment of the present technology includes an input unit and a control unit. The input unit inputs a first image that is captured by a first imaging apparatus that sets a first imaging space as an imaging target, and a second image that is captured by a second imaging apparatus that sets a second imaging space different from the first imaging space as an imaging target and switched to/from the first image and displayed. The control unit outputs, when the first and second images are switched to each other, a switching moving image reflecting positional relevance between the first and second imaging spaces.

9 Claims, 29 Drawing Sheets

(51) Int. Cl.
*G06T 7/292* (2017.01)
*H04N 5/232* (2006.01)
*G08B 13/196* (2006.01)

(52) U.S. Cl.
CPC . *G08B 13/19608* (2013.01); *G08B 13/19645* (2013.01); *G08B 13/19691* (2013.01); *H04N 5/232* (2013.01); *H04N 5/23225* (2013.01); *H04N 5/23296* (2013.01); *H04N 7/18* (2013.01); *G06T 2207/10016* (2013.01); *G06T 2207/30232* (2013.01)

(56) References Cited

U.S. PATENT DOCUMENTS

| | | | | |
|---|---|---|---|---|
| 8,274,564 | B2* | 9/2012 | Girgensohn | H04N 7/181 348/143 |
| 9,055,234 | B2* | 6/2015 | Weber | G03B 37/04 |
| 2004/0252194 | A1* | 12/2004 | Lin | G08B 13/19645 348/169 |
| 2006/0132482 | A1* | 6/2006 | Oh | G06T 13/80 345/419 |
| 2012/0307113 | A1* | 12/2012 | Peles | H04N 5/262 348/239 |
| 2013/0002869 | A1* | 1/2013 | Yuasa | H04N 5/232 348/143 |
| 2013/0147961 | A1* | 6/2013 | Gao | H04N 7/181 348/159 |

FOREIGN PATENT DOCUMENTS

| | | |
|---|---|---|
| JP | 2006-146378 A | 6/2006 |
| JP | 2008-289091 A | 11/2008 |
| JP | 2009-251940 A | 10/2009 |

* cited by examiner

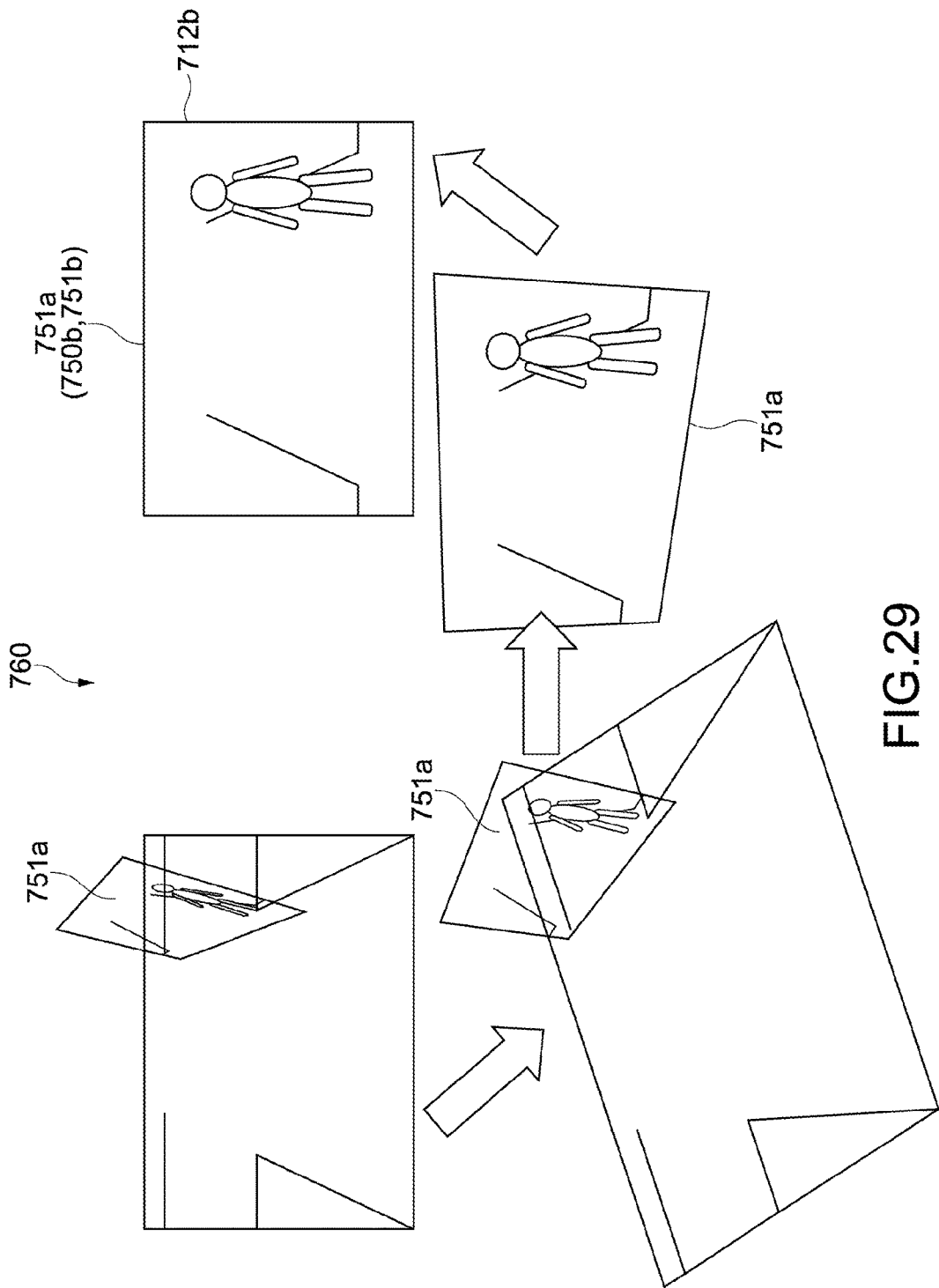

CONTROLLING DISPLAY BASED ON AN OBJECT POSITION IN AN IMAGING SPACE

TECHNICAL FIELD

The present technology relates to an information processing apparatus, an information processing method, a program, and an information processing system that can be used for, for example, a monitoring camera system.

BACKGROUND ART

For example, Patent Document 1 describes, as a technique applicable to a monitoring camera system, a technique for easily and accurately specifying a tracking target before tracking or during tracking an object. In this technique, the object to be the tracking target is enlarged and displayed and other objects are extracted as tracking target candidates. Only by performing an easy operation of selecting a target (tracking target) that the user wishes to enlarge and display among the extracted tracking target candidates, it becomes possible to obtain a desired enlarged and displayed image (zoom image) (see paragraphs [0010],[0097], etc. in specification of Patent Document 1).

Patent Document 1: Japanese Patent Application Laid-open No. 2009-251940

SUMMARY OF INVENTION

Problem to be Solved by the Invention

A technique for enabling a useful monitoring camera system as described in Patent Document 1 to be realized is desirable.

In view of the above-mentioned circumstances, it is an object of the present technology to provide an information processing apparatus, an information processing method, a program, and an information processing system, by which a useful monitoring camera system can be realized.

Means for Solving the Problem

In order to achieve the above-mentioned object, an information processing apparatus according to an embodiment of the present technology includes an input unit and a control unit.

The input unit inputs a first image that is captured by a first imaging apparatus that sets a first imaging space as an imaging target, and a second image that is captured by a second imaging apparatus that sets a second imaging space different from the first imaging space as an imaging target and switched to/from the first image and displayed.

The control unit outputs, when the first and second images are switched to each other, a switching moving image reflecting positional relevance between the first and second imaging spaces.

In this information processing apparatus, the first image of the first imaging space and the second image of the second imaging space are input. Then, when the first and second images are switched, the switching moving image reflecting the positional relevance between the first and second imaging spaces is output. With this, it is possible to easily understand a spatial relevance when the first and second images are switched. Using this technique, it becomes possible to realize a useful monitoring camera system.

The control unit may include a setting unit and a generation unit.

The setting unit sets a region corresponding to the positional relevance between the first and second imaging spaces as a first region in the first image and as a second region in the second image.

The generation unit generates a first moving image in which a first region image representing the first region is moved reflecting the positional relevance as a switching moving image to the second image, and generates a second moving image in which a second region image representing the second region is moved reflecting the positional relevance as a switching moving image to the first image.

In this manner, the first moving image in which an image of a predetermined region of the first image is moved may be generated as the switching moving image to the second image. Further, the second moving image in which an image of a predetermined region of the second image may be generated as the switching moving image to the first image may be generated. Each region image is moved reflecting the positional relevance between the imaging spaces and hence it is possible to easily understand a spatial relevance when the first and second images are switched.

The setting unit may set a common region captured in common between the first and second images as the first region in the first image and as the second region in the second image. In this case, the generation unit may generate a moving image in which the first region image is moved to a position of the second region in the second image as the first moving image, and generate a moving image in which the second region image is moved to a position of the first region in the first image as the second moving image.

With this, with the common region being a reference, it becomes possible to easily understand the positional relevance between the first and second imaging spaces. As a result, it becomes possible to realize a useful monitoring camera system.

The generation unit may generate a moving image in which the first region image is moved to an outside of a screen, and generate a moving image in which the second region image is moved to the outside of the screen as the second moving image.

For example, if the common region captured in common between the first and second images is not set, the first and second moving images in which the first and second region images are moved to the outside of the screen are appropriately generated. With this, it becomes possible to generate a switching moving image from which the positional relevance between the imaging spaces can be understood.

The information processing apparatus may further include a tracking unit that tracks an object as a tracking target in the first and second images. In this case, the control unit may output the first moving image when a distance between the object as the tracking target and the first region becomes smaller than a predetermined value, and output the second moving image when a distance between the object as the tracking target and the second region becomes smaller than a predetermined value.

In this information processing apparatus, it becomes possible to track the predetermined object as the tracking target in the first and second images. Then, when the object as the tracking target approaches the first region within a predetermined distance, the first moving image is output and switching to the second image is performed. Further, when the object as the tracking target approaches the second region within a predetermined distance, the second moving image is output and switching to the first image is performed. With this, it becomes possible to efficiently track the tracking target object and it is possible to realize a useful monitoring camera system.

The control unit may output the first region image into the first image when the distance between the object as the tracking target and the first region becomes smaller than the predetermined value, and output when the second region image into the second image the distance between the object as the tracking target and the second region becomes smaller than the predetermined value.

In this manner, according to a motion of the tracking target object, the display of the first and second region images in the first and second images may be controlled.

The information processing apparatus may further include an instruction input unit that inputs an instruction from a user. In this case, the control unit may output the first moving image according to an instruction to select the first region image input via the instruction input unit, and output the second moving image according to an instruction to select the second region image input via the input unit.

In this manner, according to the selection of the first and second region images, switching between the first and second images may be performed. With this, a useful monitoring camera system is realized.

An information processing method according to an embodiment of the present technology is an information processing method executed by a computer, including inputting a first image captured by a first imaging apparatus that sets a first imaging space as an imaging target and a second image captured by a second imaging apparatus that sets a second imaging space different from the first imaging space as an imaging target and switched to/from the first image and displayed.

When the first and second images are switched to each other, a switching moving image reflecting a positional relevance between the first and second imaging spaces is output.

A program according to an embodiment of the present technology causes a computer to execute the following steps.

A step of inputting a first image captured by a first imaging apparatus that sets a first imaging space as an imaging target and a second image captured by a second imaging apparatus that sets a second imaging space different from the first imaging space as an imaging target and switched to/from the first image and displayed.

A step of outputting, when the first and second images are switched to each other, a switching moving image reflecting a positional relevance between the first and second imaging spaces.

An information processing system according to an embodiment of the present technology includes a first imaging apparatus, a second imaging apparatus, and an information processing apparatus.

The first imaging apparatus sets a first imaging space as an imaging target.

The second imaging apparatus sets a second imaging space different from the first imaging space as an imaging target.

The information processing apparatus includes an input unit and a control unit.

The input unit inputs a first image captured by the first imaging apparatus and a second image captured by the second imaging apparatus and switched to/from the first image and displayed.

The control unit outputs, when the first and second images are switched to each other, a switching moving image reflecting a positional relevance between the first and second imaging spaces.

Effect of the Invention

As described above, according to the present technology, it becomes possible to realize a useful monitoring camera system.

BRIEF DESCRIPTION OF DRAWINGS

FIG. 29 A schematic diagram for describing processing of switching between the first and second images serving as the other embodiment.

MODE(S) FOR CARRYING OUT THE INVENTION

Hereinafter, embodiments according to the present technology will be described with reference to the drawings.

[Monitoring Camera System]

Figure 1:
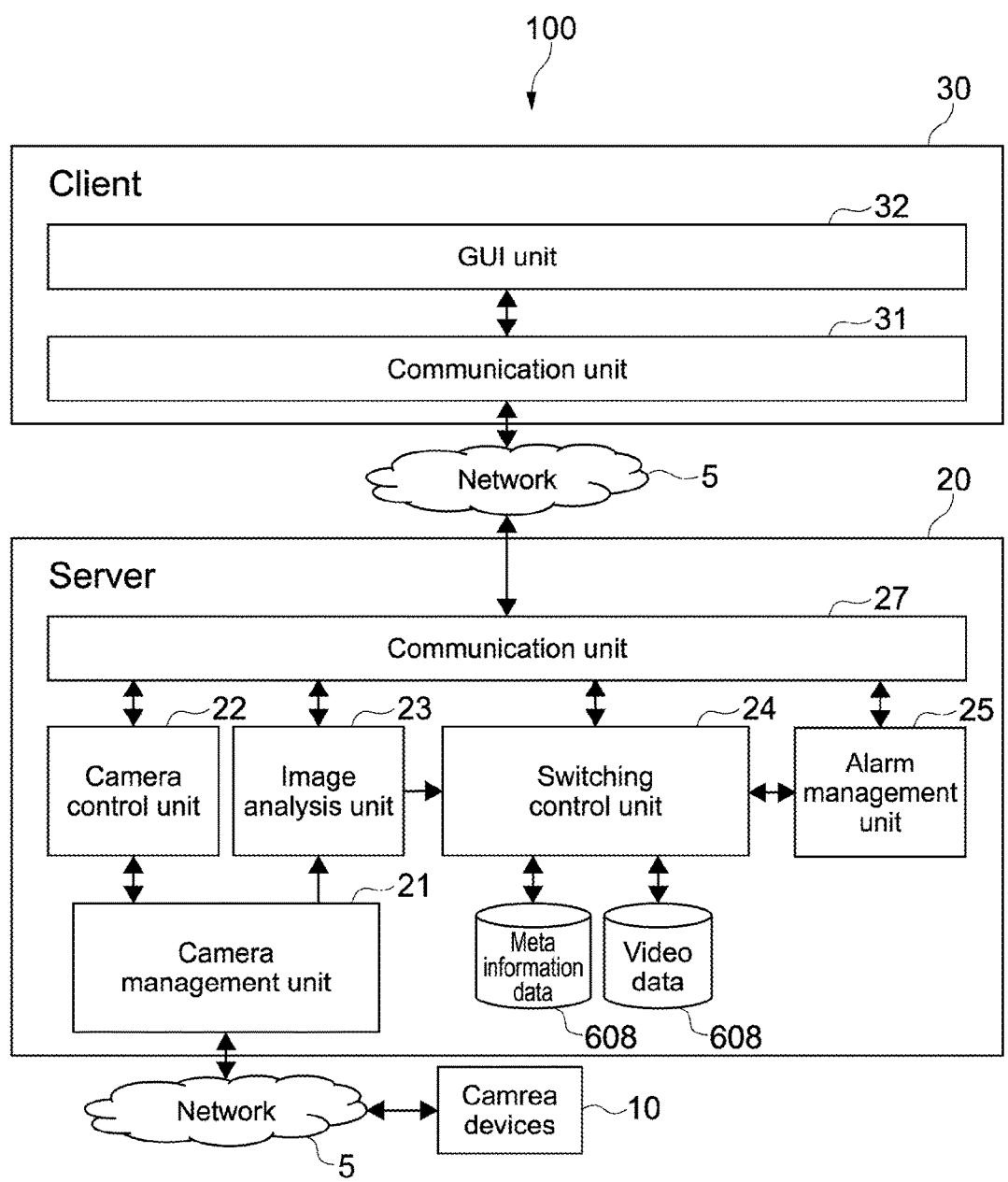
FIG. 1 A block diagram showing a configuration example of a monitoring camera system including an information processing apparatus according to an embodiment of the present technology.

FIG. 1 is a block diagram showing a configuration example of a monitoring camera system including an information processing apparatus according to an embodiment of the present technology.

A monitoring camera system 100 includes a plurality of cameras 10, a server apparatus 20 that is the information processing apparatus according to this embodiment, and a client apparatus 30. The plurality of cameras 10 and the server apparatus 20 are connected via a network 5. The server apparatus 20 and the client apparatus 30 are also connected via a network 5.

For example, a LAN (Local Area Network) or a WAN (Wide Area Network) is used as the network 5. The type of the network 5 and a protocol or the like used for it are not limited. The two networks 5 shown in FIG. 1 do not need to be the same.

The plurality of cameras 10 are cameras capable of capturing a moving image of a digital video camera, for example. These cameras 10 generate moving image data formed of a plurality of temporally continuous frame images. The frame images are generated at a frame rate of, for example, 30 fps (frame per second) or 60 fps. The moving image data may be generated on a field-by-field basis. Each camera 10 corresponds to an imaging apparatus according to this embodiment.

Hereinafter, temporally continuous images forming a moving image like the frame images will be simply referred to as images. If the camera 10 is capable of capturing both a moving image and a still image, the "images" include both images forming a moving image and images generated as still images. Thus, the images captured by the camera 10 include both moving images and still images.

The client apparatus 30 includes a communication unit 31 and a GUI unit 32. The communication unit 31 is used for communication with the server apparatus 20 via the network 6. The GUI unit 32 displays a moving image, a GUI (Graphical User Interface) for various operations, and other information, and the like. For example, a moving image or the like transmitted from the server apparatus 20 via the network 6 is received by the communication unit 31. The moving image or the like is output to the GUI unit 32 and displayed on a display unit (not shown) as a predetermined GUI.

An operation from a user is input into the GUI unit 32 via a GUI or the like displayed on the display unit. The GUI unit 32 generates instruction information based on an input operation and outputs it to the communication unit 31. The communication unit 31 transmits the instruction information to the server apparatus 20 via the network 6. Note that a block that generates and outputs instruction information based on an input operation may be provided separately from the GUI unit 32.

For example, a PC (Personal Computer) and a portable terminal such as a tablet is used as the client apparatus 30. However, it is not limited thereto.

The server apparatus 20 includes a camera management unit 21 and a camera control unit 22 and an image analysis unit 23 that are connected thereto. The server apparatus 20 further includes a switching control unit 24, an alarm management unit 25, and a storage unit 608 that stores various types of data. The server apparatus 20 further includes a communication unit 27 used for communication with the client apparatus 30. To the communication unit 27, connected are the camera control unit 22, the image analysis unit 23, the switching control unit 24, and the alarm management unit 25.

The communication unit 27 transmits moving images and various types of information from the connected respective blocks to the client apparatus 30 via the network 6. The communication unit 27 receives the instruction information transmitted from the client apparatus 30 and outputs it to the respective blocks of the server apparatus 20. For example, the instruction information may be output to the respective blocks via a control unit or the like (not shown) that controls an operation of the server apparatus 20. The communication unit 27 functions as an instruction input unit in this embodiment.

The camera management unit 21 transmits a control signal from the camera control unit 22 to the plurality of cameras 10 via the network 5. With this, various operations of the camera 10 are controlled. For example, a pan-tilt operation, a zoom operation, a focus operation, and the like of the camera are controlled.

Further, the camera management unit 21 receives a moving image transmitted from the plurality of cameras 10 via the network 5. Then, the camera management unit 21 outputs the moving image to the image analysis unit 23. If needed, pre-processing such as noise processing may be performed. The camera management unit 21 functions as an input unit in this embodiment.

The image analysis unit 23 analyzes the moving image from each camera 10 for each image (frame image). For example, the type and number of objects in an image, the motion of the objects, and the like are analyzed. In this embodiment, the image analysis unit 23 extracts each of the objects in the image. If a predetermined object is set as a tracking target, tracking of the object as the tracking target is performed. Specifically, position information indicating a position of the tracking target object is calculated for each of the continuous images. A technique used for extracting and tracking an object is not limited and a well-known technique may be used. Alternatively, another image analysis may be appropriately performed. In this embodiment, the image analysis unit 23 functions as a tracking unit.

The alarm management unit 25 manages an alarm display with respect to an object in an image. For example, based on an instruction from the user and an analysis result of the image analysis unit 23, a predetermined object is detected as a suspicious person or a suspicious object. The detected suspicious person or the like is alarm-displayed (alarmed and displayed). At this time, the type of alarm display, a timing of execution of the alarm display, and the like are managed.

The switching control unit 24 performs processing for alternately switching between images captured by the plurality of cameras 10. For example, according to an instruction from the user, an image of a predetermined camera 10 is switched to an image of another camera 10 and the image is transmitted to the client apparatus 30. Switching between images may be automatically performed.

In this embodiment, the switching control unit 24 outputs, during switching between the images, a switching moving image reflecting the positional relevance between imaging spaces as imaging targets of the respective cameras 10. The switching between the images and outputting the switching moving image are performed based on the moving image and analysis result output from the image analysis unit 23, meta information data and video data of previous moving image stored in the storage unit 608.

In this embodiment, the switching control unit 24 functions as the setting unit and the generation unit of this control unit. Hereinafter, switching between the images by this switching control unit will be described in detail.

Figure 2:
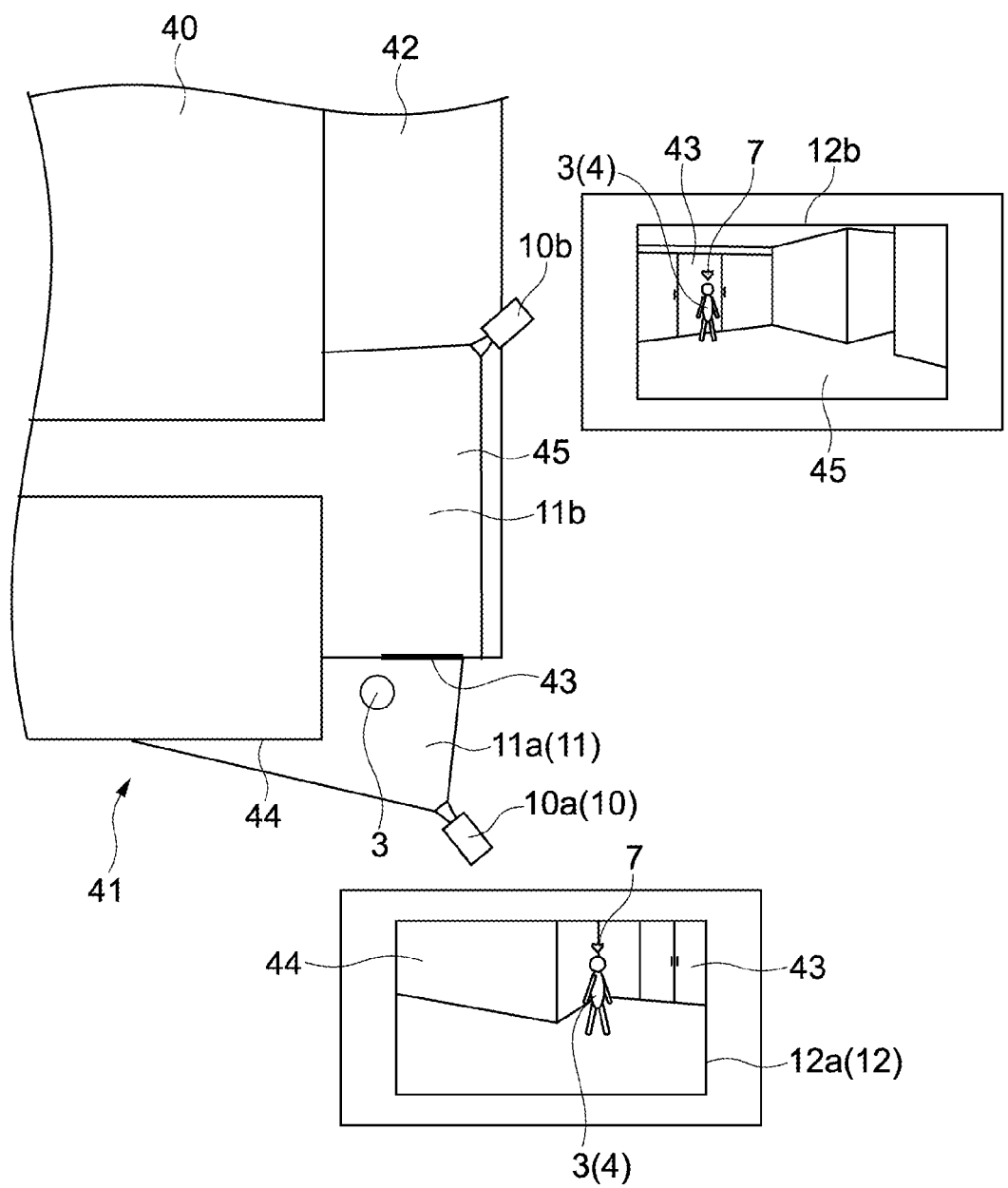
FIG. 2 A schematic diagram showing an arrangement example of cameras according to this embodiment.

FIG. 2 is a schematic diagram showing an arrangement example of the cameras 10 for describing switching between the images according to this embodiment. For example, as shown in FIG. 2, a first camera 10a serving as the first imaging apparatus is set in an outside 41 of a building 40. Further, a second camera 10b serving as the second imaging apparatus is set in an inside 42 of the building 40.

The first and second cameras 10a and 10b are placed such that their imaging targets are first and second imaging spaces 11a and 11b, respectively. Here, the imaging space 11 is a space that can be captured by the camera 10 and the range of the imaging space 11 is changed depending on an operating range of the pan/tilt operation or the like. With the camera 10 capable of capturing a larger range due to the pan/tilt operation, the imaging space 11 thereof becomes a large range. The pan/tilt operation and the zoom operation are appropriately set in the imaging space 11 and the image is captured. Thus, the captured image 12 becomes an image in which the entire imaging space 11 or a part thereof is captured.

A first imaging space 11a is a space including an entrance 43 of the building 40. Thus, as shown in FIG. 1, as a first image 12a captured by the first camera 10a, an image including the entrance 43 and an outer wall 44 of the building 40 is captured. If a person 3 as an object passes through the first imaging space 11a, for example, the person 3 is also captured in the first image 12a. In the moving image formed of the first images 12a temporally continuous, a motion of passing or the like of the person 3 is captured.

A second imaging space 11b is also a space including the entrance 43 of the building 40. Thus, as shown in FIG. 1, as a second image 12b captured by the second camera 10b, an image including the entrance 43 and a corridor 45 of the inside 42 of the building 40 is captured. If the person 3 passes through the second imaging space 11b, for example, the person 3 is captured in the second image 12b. In the moving image in which the second image 12b is temporally continuous, a motion of passing or the like of the person 3 is captured.

In this embodiment, a setting of the pan/tilt operation of the first and second cameras 10a and 10b, a setting of the zoom operation, and a setting of the zoom operation are fixed for the sake of facilitating the description of switching between the images. That is, the first image 12a representing the entire first imaging space 11a shown in FIG. 2 is fixedly captured in the first camera 10a. Further, the second camera 10b fixedly captures the second image 12b representing the entire second imaging space 11b shown in FIG. 2.

In the monitoring camera system 100, the first and second images 12a and 12b are switched to each other and displayed. When the first and second images 12a and 12b are switched, the switching moving image reflecting the positional relevance between the first and second imaging spaces 11a and 11b is output. Thus, in the client apparatus 30, the switching moving image is displayed on the display unit and then the first and second images 12a and 12b are switched to each other.

The positional relevance is defined by a position of the imaging space 11, an imaging direction of the camera 10, and the like. Typically, the position of the second imaging space 11b with respect to the first imaging space 11a and the position of the first imaging space 11a with respect to the second imaging space 11b are in the positional relevance between the first and second imaging spaces 11a and 11b. That is, a relative positional relationship between the first and second imaging spaces 11a and 11b is exemplified as the positional relevance.

Further, whether or not a region captured in common between the first and second images 12a and 12b is present is also exemplified as the positional relevance. For example, the first and second imaging spaces 11a and 11b are set to capture the same object in different directions. In this case, a predetermined region including the object is commonly captured. In this embodiment, the switching moving image can also be generated based on this region. Hereinafter, the commonly captured region will be referred to as a common region.

The first and second images 12a and 12b shown in FIG. 2 are images appropriately subjected to image processing by the server apparatus 20 and output to the client apparatus 30. As described above, in this embodiment, tracking processing can be performed on the object in the first and second images 12a and 12b. In the example shown in FIG. 2, the person 3 is set as the object as the tracking target 4 and a motion of the person 3 is tracked. In the first and second images 12a and 12b, a mark 7 indicating that the person 3 is set as a tracking target object 4 is displayed.

FIGS. 3 to 21 are diagrams for describing switching between images according to this embodiment, which are diagrams showing an example of the switching moving image. The images shown in FIGS. 3 to 22 are generated by the switching control unit 24 of the server apparatus 20 and transmitted to the client apparatus 30. In the following description, the expression that the image or the moving image is displayed is sometimes used. It means that the image or the moving image is generated and output from the perspective of the server apparatus 20.

Figure 3:
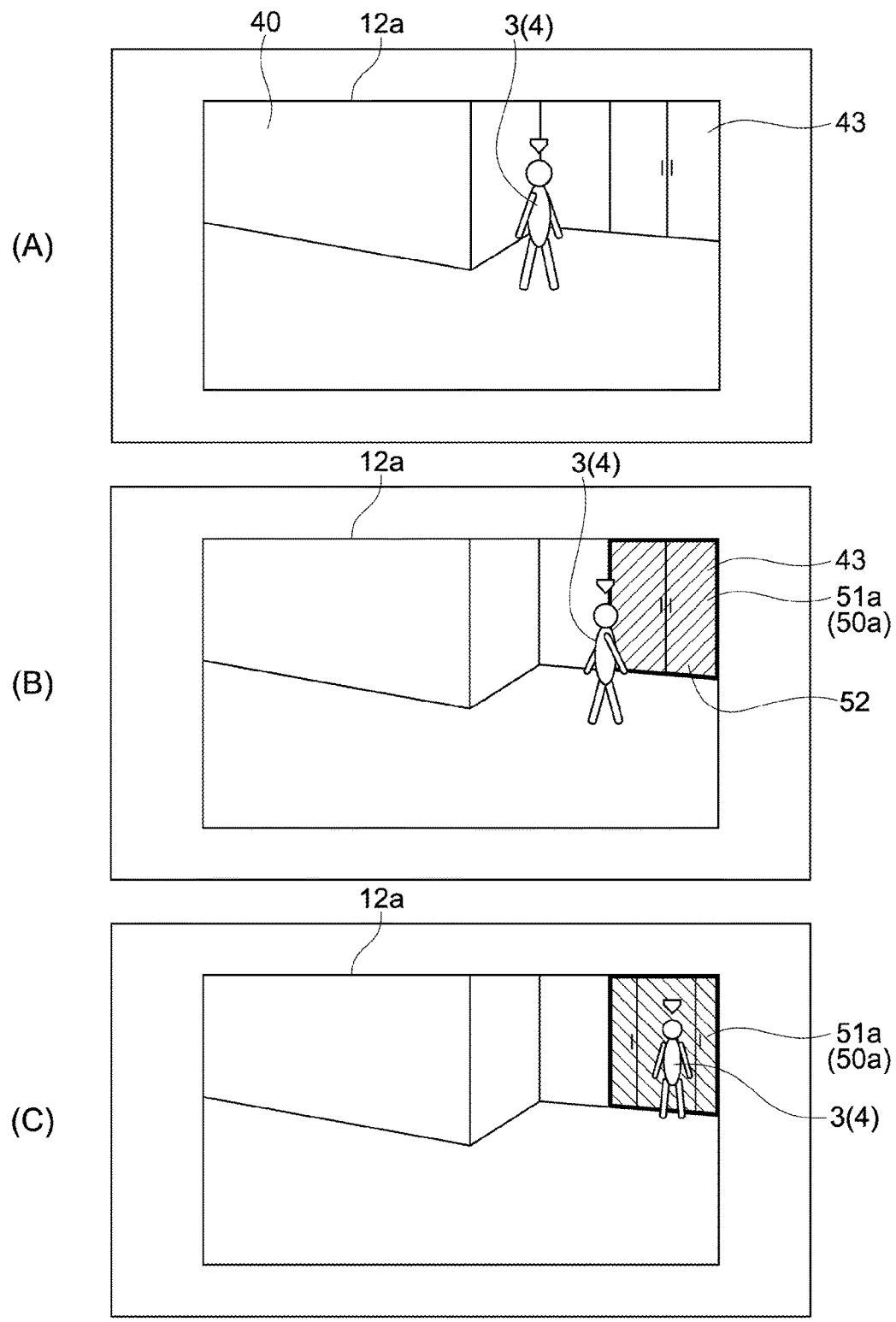
FIG. 3 A diagram showing an example of switching between images and a switching moving image according to this embodiment.

As shown in (A) of FIG. 3, the person 3 is moved to the entrance 43 of the building 40. As shown in (B) of FIG. 3, when the person 3 approaches the entrance 43, an image 51a of a region 50a corresponding to a position of the entrance 43 is output into the first image 12a. Hereinafter, the image 51a representing the region 50a will be described with a symbol of the region 50a.

The region 50a will be described. In this embodiment, a region based on the positional relevance between the first and second imaging spaces 11a and 11b is set as a first region in the first image 12a and as a second region in the second image 12b. Then, the first moving image in which the first region image representing the first region is moved reflecting the positional relevance is generated as a switching moving image to the second image. Further, the second moving image in which the second region image representing the second region is moved reflecting the positional relevance is generated as a switching moving image to the first image.

In this embodiment, in each of the first and second images 12a and 12b, the entrance 43 is captured. Thus, the entrance 43 becomes a region captured as a common region 52. In this embodiment, the region 50a including the entrance 43 that is the common region 52 is set as the first region (hereinafter, referred to as first region 50a). As shown in (A) of FIG. 7, in the second image 12b, a region 50b including the entrance 43 becomes the common region 52 and the region 50b is set as the second region (hereinafter, referred to as second region 50b).

The first and second regions 50a and 50b typically have a rectangular shape and set using coordinate information having four vertices. However, the shape of the first and second regions 50a and 50b is not limited and a region having a circular shape, a polygonal shape, or the like may be set. Further, data representing the first and second regions 50a and 50b is not limited. For example, a region conforming the shape of the commonly captured object may be set as the first and second regions 50a and 50b. In this case, information on the outer shape of the object and the position information are used to set the first and second regions 50a and 50b.

The image 51a of the region 50a shown in (B) of FIG. 3 is the image 51a of the first region 50a (hereinafter, referred to as first region image 51a). When a distance between the person 3 as the tracking target object 4 and the first region 50a becomes smaller than a predetermined value, the first region image 51a is output into the first image 12a. With this, it becomes possible to know a position of a region (first region 50a) that is a reference when the image is switched. Further, it becomes possible to know a position of a switching point that becomes a point at which the image is switched. A threshold set as the predetermined value may be appropriately set.

Figure 7:
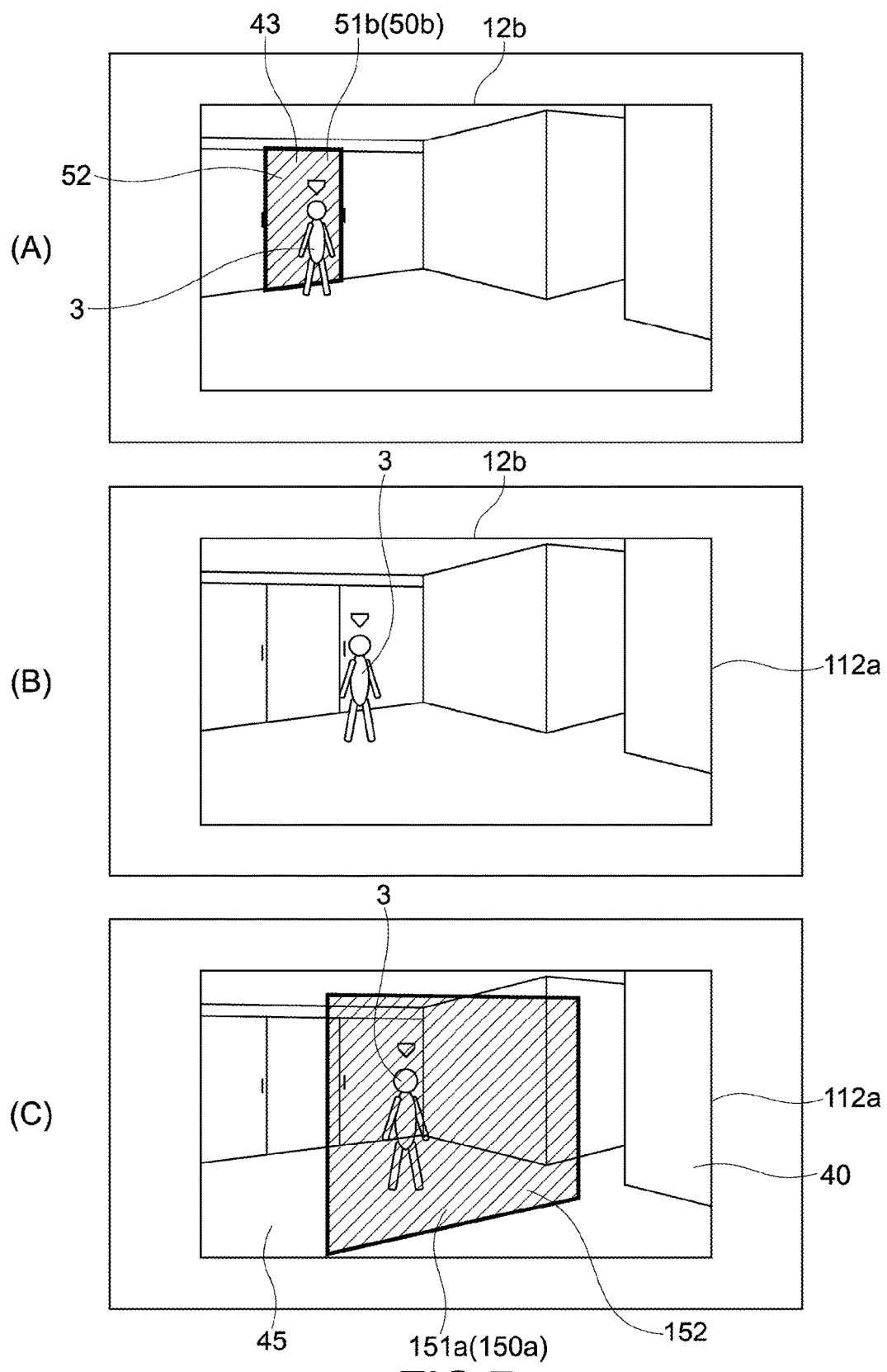
FIG. 7 A diagram showing an example of switching between the images and the switching moving image according to this embodiment.

Also in the second image 12b shown in (A) of FIG. 7, when the distance between the person 3 and the second region 50b becomes smaller than the predetermined value, a second region image 51b is output into the second image 12b. With this, with the second region image 51b being a reference, it is possible to know that switching between the images is performed. Note that, as the first and second region images 51a and 51b, a semi-transparent image representing the entire region may be employed or a frame-like image representing edges of the region may be employed. Other images may be displayed as the first and second region images 51a and 51b.

As shown in (C) of FIG. 3, when the person 3 approaches the first region 50a and almost overlaps with the first region 50a, switching between the images is started. That is, in this embodiment, when the distance between the person 3 as the tracking target object 4 and the first region 50a becomes smaller than the predetermined value, the first moving image is output and switching processing to the second image 12b is performed. Further, when the distance between the person 3 and the second region 50b becomes smaller than the predetermined value, the second moving image is output and switching processing to the first image 12a is performed. Here, a threshold set as the predetermined value may be appropriately set.

As shown in (C) of FIG. 3, when switching processing is started, the first region image 51a is switched. For example, the color, shape, and the like of the first region image 51a is switched. With this, the user can know that switching between the images is started. Similarly, the second region image 51b is also changed at a timing when the person 3 approaches and switching between the images is started.

Figure 4:
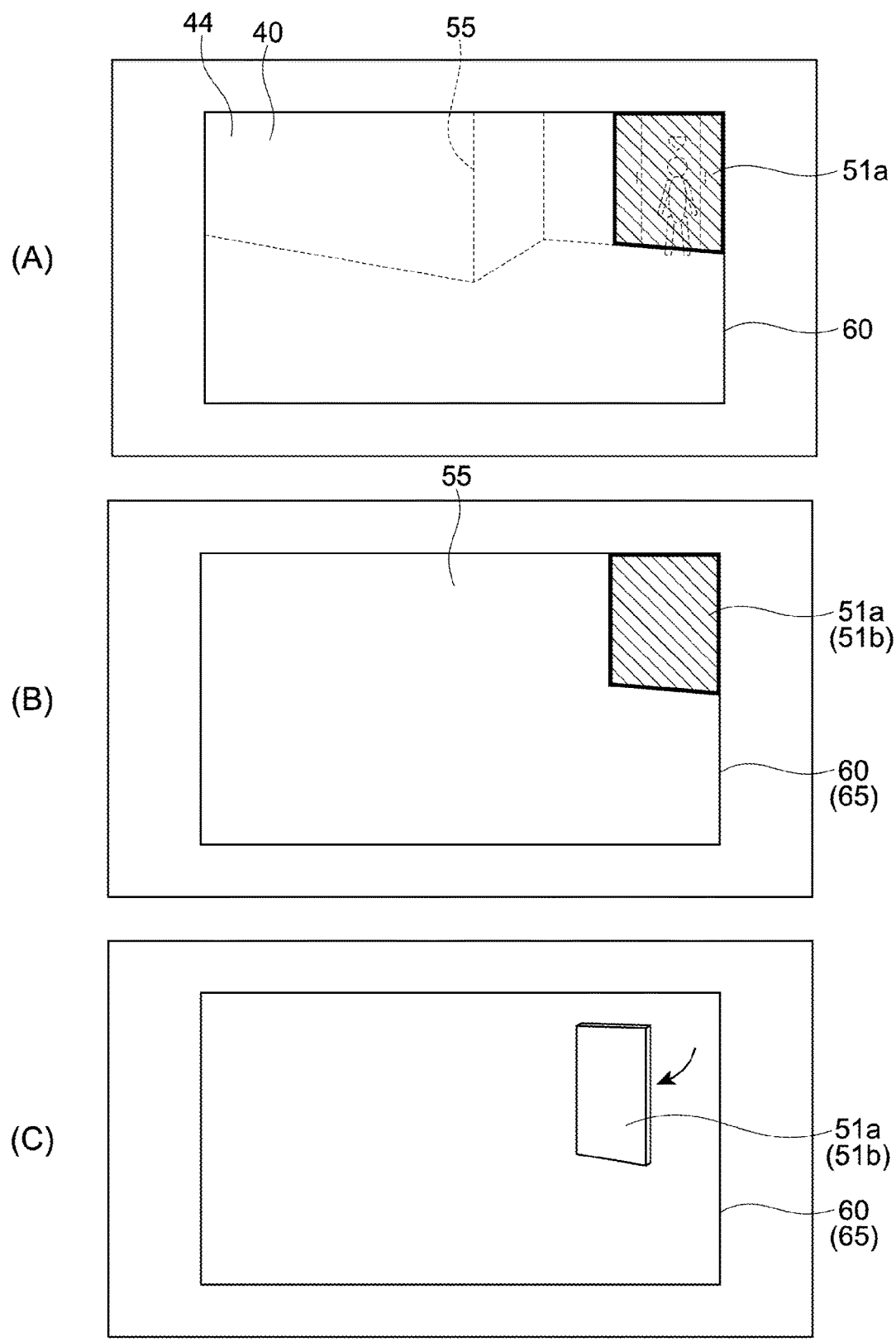
FIG. 4 A diagram showing an example of switching between the images and the switching moving image according to this embodiment.

As a first moving image 60, first as shown in (A) and (B) of FIG. 4, a moving image in which the first region image 51a is emphasized is displayed. For example, a moving image in which a region 55 other than the first region image 51a gradually becomes darker is displayed. The region 55 other than the first region image 51a may be represented in another color, for example, white or gray. Alternatively, the region 55 other than the first region image 51a may be displayed in a semi-transparent manner. On the other hand, the color or the like of the first region image 51a may be changed and the display may be emphasized.

Figure 5:
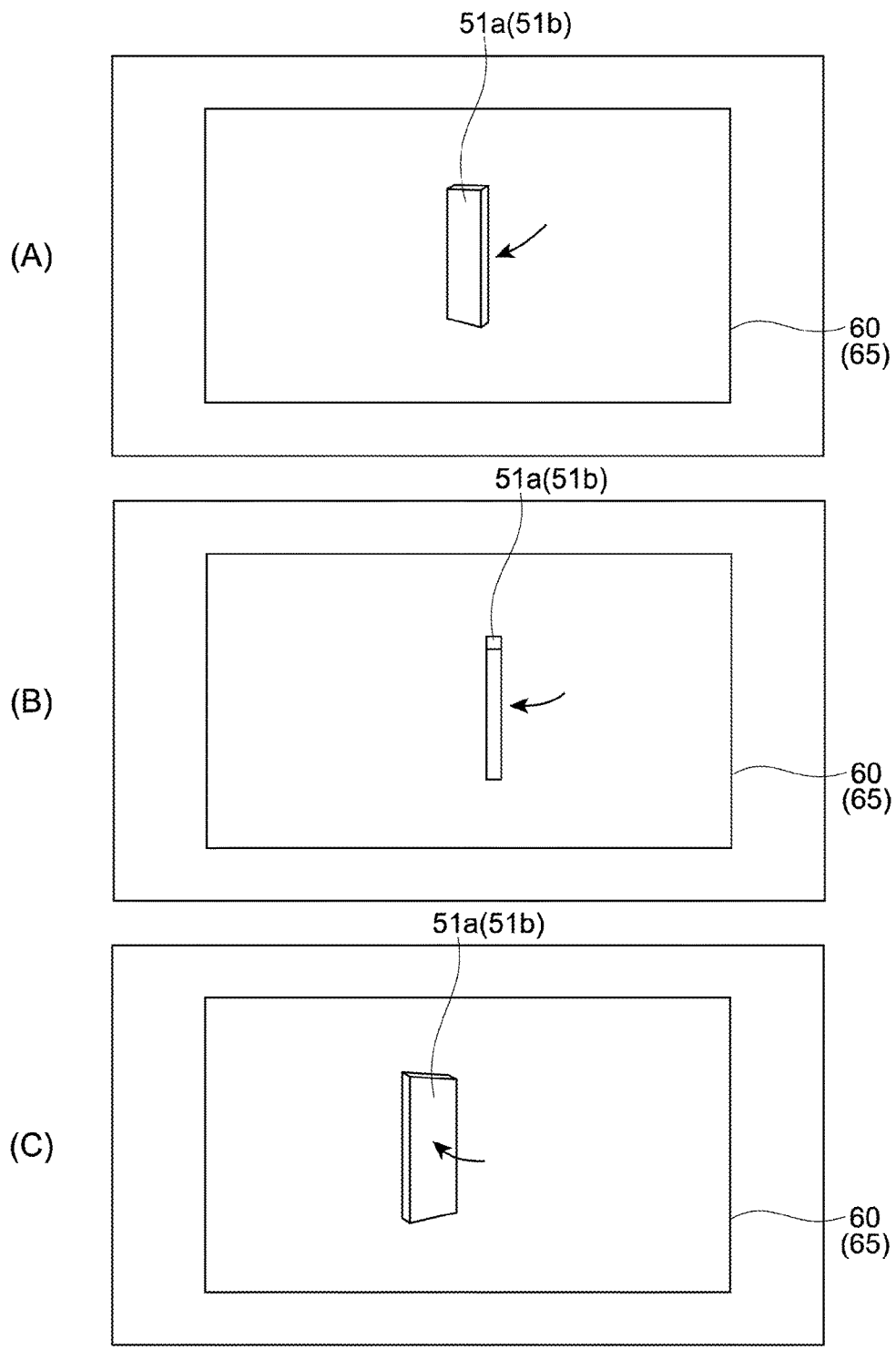
FIG. 5 A diagram showing an example of switching between the images and the switching moving image according to this embodiment.
Figure 6:
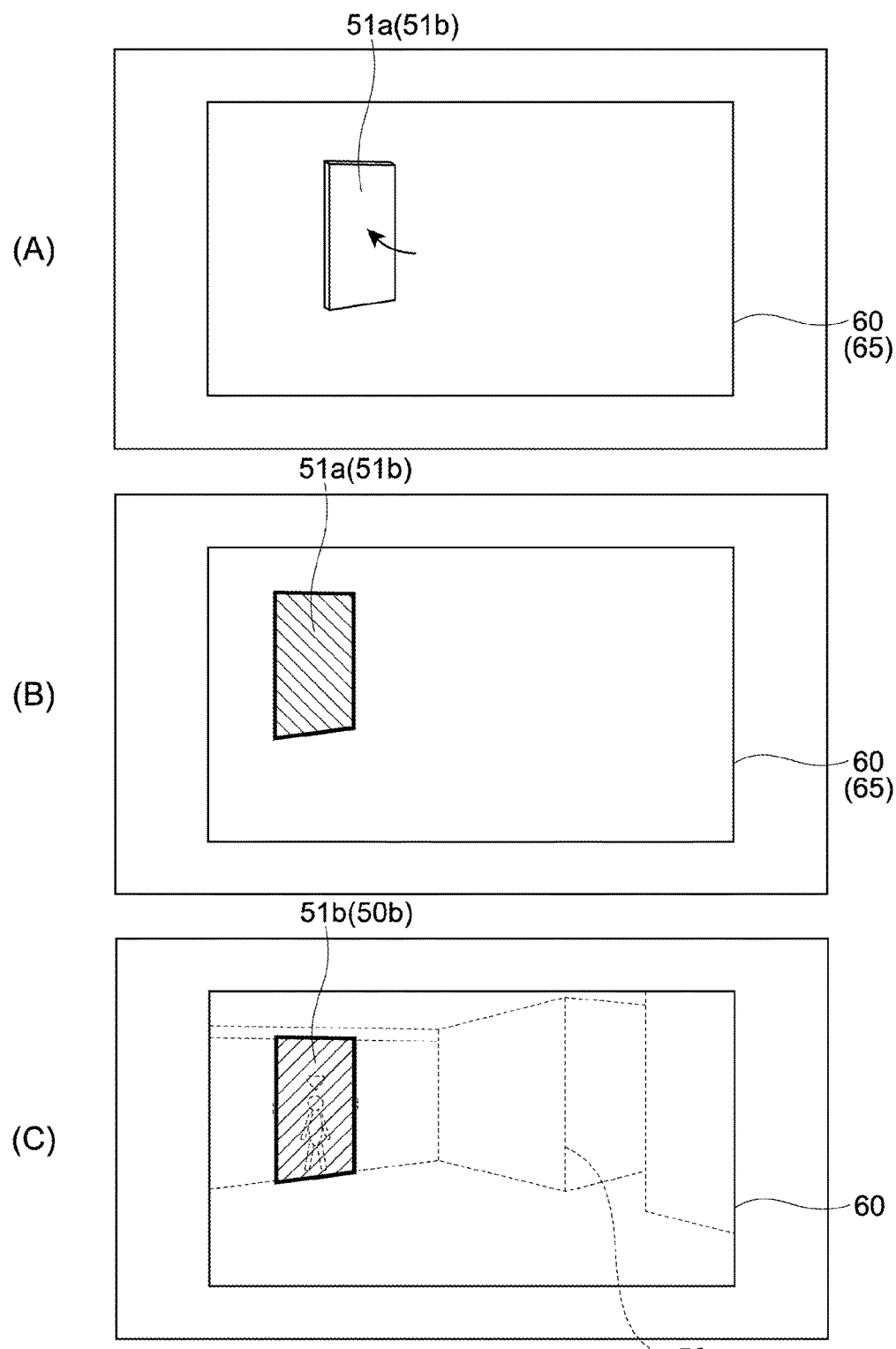
FIG. 6 A diagram showing an example of switching between the images and the switching moving image according to this embodiment.

In (C) of FIG. 4, (A) to (C) of FIG. 5, and (A) and (B) of FIG. 6, the first moving image 60 in which the first region image 51a is moved reflecting the positional relevance between the first and second imaging spaces 11a and 11b is displayed. As shown in FIG. 2, regarding the first and second imaging spaces 11a and 11b, imaging directions thereof are opposite at almost 180 degrees. That is, the first and second images 12a and 12b are two images capturing the entrance 43 from almost opposite directions.

Thus, as shown in (C) of FIG. 4 to (A) of FIG. 6, the moving image in which the first region image 51a is almost semi-rotated is generated and displayed as the first moving image 60. With this, a point of view of the user can be guided in an opposite direction by almost 180 degrees. Then, a feeling as if the point of view of the user were moved from a placement position of the first camera 10a to a placement position of the second camera 10b can be produced. As a result, it becomes possible to easily understand a positional relationship between the first and second images 12a and 12b.

In the case of the moving image reflecting the positional relevance between the first and second imaging spaces 11a and 11b, any moving image can be generated as the first moving image 60. For example, in the first moving image 60 shown in FIG. 6 or the like, the shape and size of the first region image 51a being moved, the speed of its rotation and movement, and the like can be appropriately set. Although an arrow for describing the rotation is shown in the figure, such an arrow may be actually displayed in the first moving image 60. Otherwise, a compass for indicating an azimuth may be displayed and the rotation, movement, and the like of the first region image 51a may be expressed by a rotation or the like of the compass. Alternatively, a text saying "being rotated" may be displayed.

Further, in this embodiment, as shown in (B) of FIG. 6, the first moving image 60 in which the first region image 51a is moved to a position of the second region 50b in the second image 12b is generated. As described above, the first and second regions 50a and 50b are the common region 52 captured in common between the first and second images 12a and 12b. Thus, the first and second regions 50a and 50b are regions corresponding to each other and the first region 50a in the first image 12a corresponds to the second region 50b in the second image 12b.

As the first moving image 60, a moving image in which the first region image 51a is moved, reflecting the positional relevance between the imaging spaces, to the position of the second region 50b is generated. With this, with the common region 52 being a reference, it is possible to easily know a spatial positional relationship between the first and second images 12a and 12b. As a result, it is possible to easily understand the positional relevance between the first and second imaging spaces 11a and 11b. Note that the first region image 51a that has been moved to the position of the second region 50b will be sometimes referred to as the second region image 51b.

In switching from the second image 12b to the first image 12a, a second moving image 65 in which the second region image 51b is moved reflecting the positional relevance between the imaging spaces is generated and displayed. The moving image in which the first moving image 60 in (B) of FIG. 6 to (B) of FIG. 4 is oppositely moved is generated as the second moving image 65. Further, the moving image in which the second region image 51b is moved to a position of the first region 50a in the first image 12a is generated as the second moving image 65. With this, it becomes possible to easily understand the positional relevance between the first and second imaging spaces 11a and 11b. Note that, as a technique for generating the first and second moving images 60 and 65, any technique for generating a moving image can be used.

In (C) of FIG. 6 to (A) of FIG. 7, a region 56 other than the second region image 51b is gradually displayed. With this, the display of the first moving image 60 is terminated and switching to the second image 12b is terminated. Note that, in (A) of FIG. 7, the second region image 51b is displayed in the switched second image 12b. With this, it becomes possible to know that it is switched from the first image 12a and displayed.

As shown in (B) of FIG. 7, the display of the second region image 51b is released when the person 3 moves away from the second region 50b. For example, the display is released when it moves away beyond a distance set as a threshold for displaying the second region 50b. Otherwise, when a motion of the person 3 is detected, the display of the second region image 51b may be released.

Subsequently, switching between the second image 12b shown in (B) of FIG. 7 and the image shown in (C) of FIG. 10 will be described. For this, the second image 12b shown in (B) of FIG. 7 will be referred to as a first image 112a. Then, the image shown in (C) of FIG. 10 will be referred to as a second image 112b.

As shown in (C) of FIG. 7, the person 3 advances through the corridor 45 of the building 40. In the first image 112a, a middle region of the corridor 45 is set as a first region 150a. Thus, when the person 3 advances through the corridor 45 and approaches the first region 150a, a first region image 151a is output into the first image 112a.

Thus, assuming that the first image 112a is a reference, the first region (second region 50b) for switching to the image (first image 12a) shown in (A) of FIG. 3 is set in the first image 112a. Further, the first region 150a for switching to the second image 112b shown in (C) of FIG. 10 is set. That is, two first regions are set in the first image 112a. First regions as many as the number of switching points at which this image is switched from the other image are set for one image. In other words, the first and second regions are set for a pair of two images switched to each other.

The first region 150a shown in (C) of FIG. 7 is a common region 152 commonly captured in a second image 112a. Thus, as shown in (C) of FIG. 10, in the second image 112b, a region corresponding to the first region 150a is set as a second region 150b.

Figure 8:
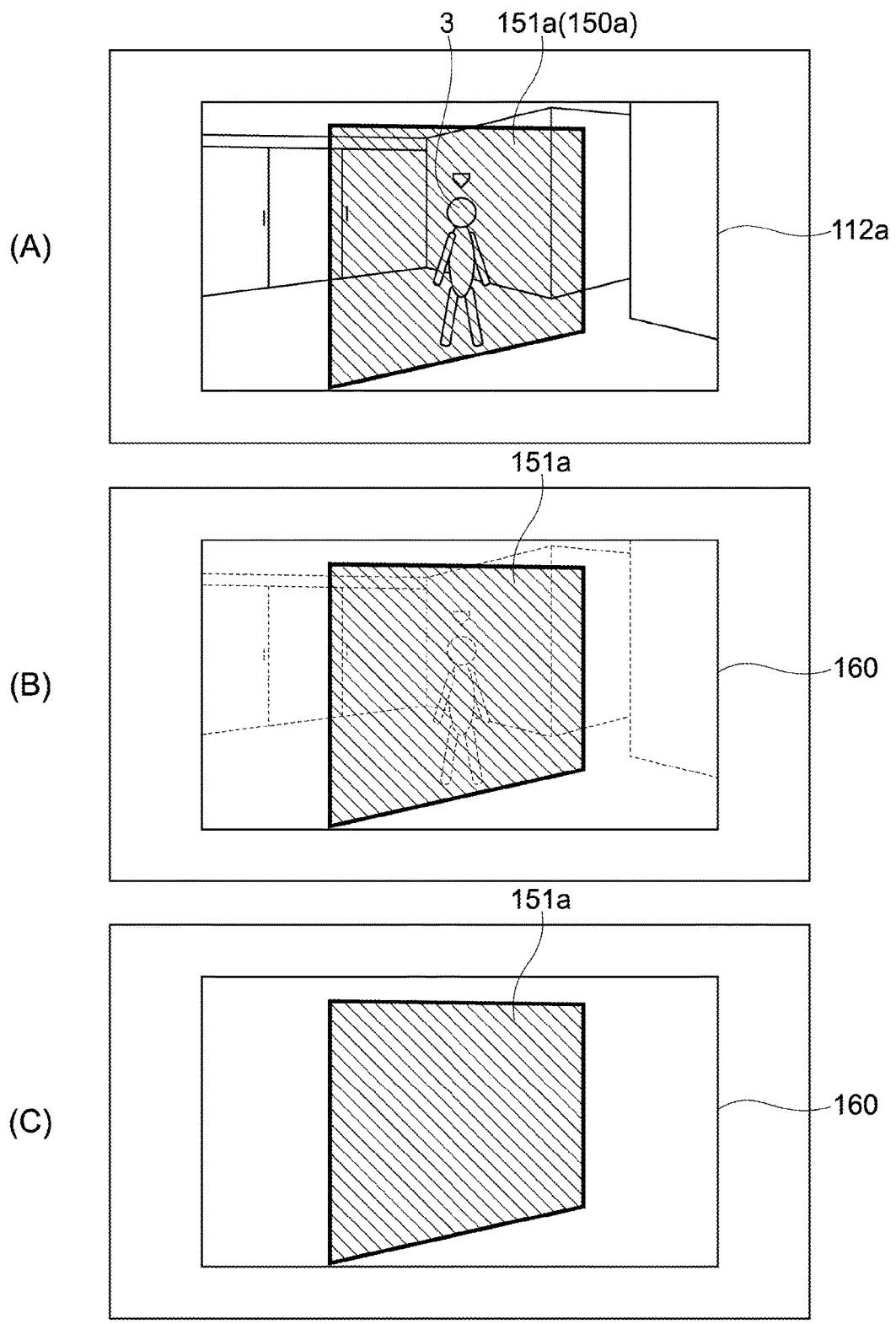
FIG. 8 A diagram showing an example of switching between the images and the switching moving image according to this embodiment.

As shown in (A) of FIG. 8, when the person 3 further approaches the first region 150a, the first region image 151a is changed and switching from the first image 112a to the second image 112b is started. As shown in (B) and (C) of FIG. 8, a moving image in which the first region image 151a is emphasized is displayed. Then, to (A) of FIG. 10, a first moving image 160 in which the first region image 151a is moved reflecting the positional relevance between the first and second imaging spaces is displayed.

Figure 10:
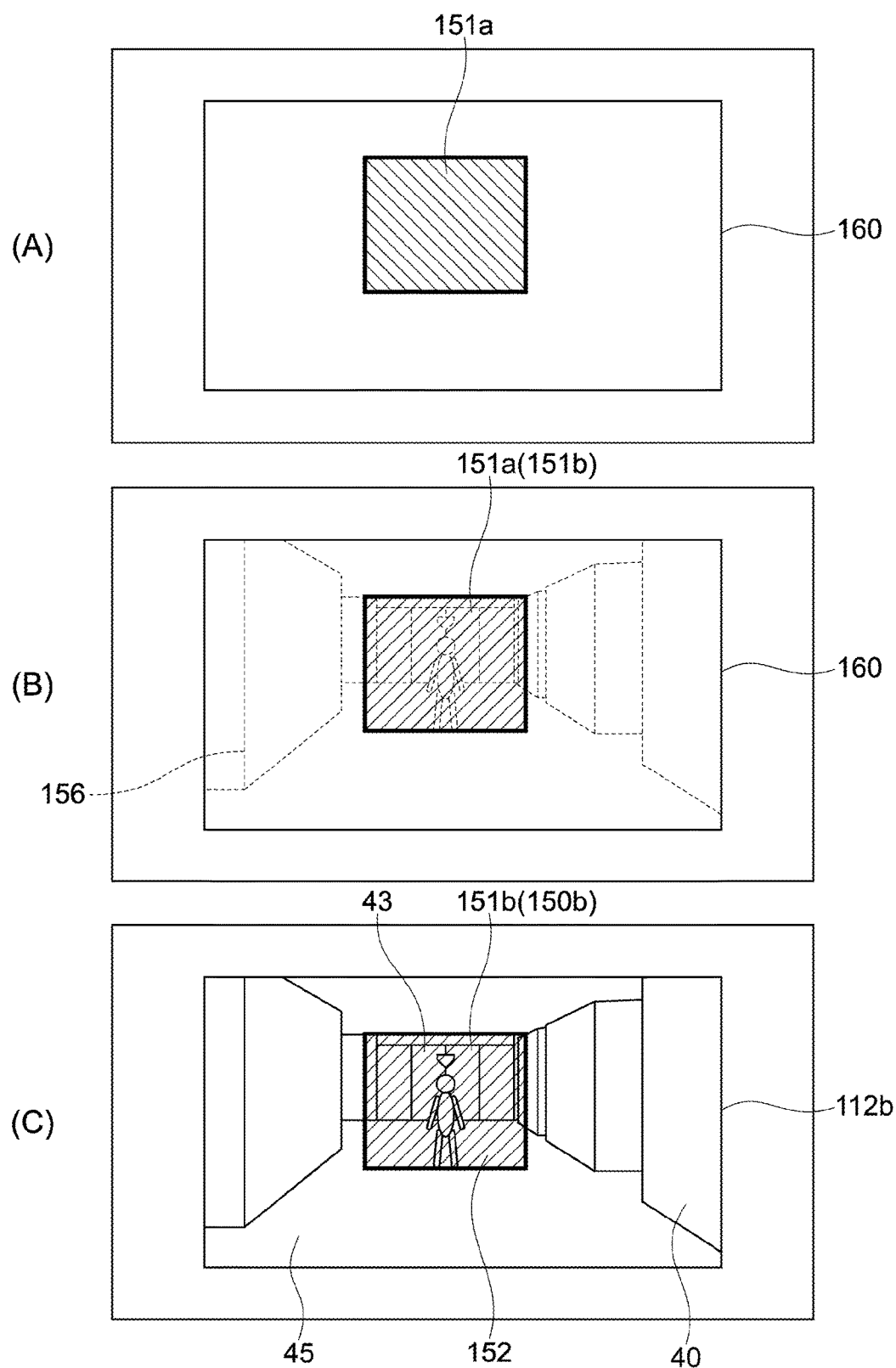
FIG. 10 A diagram showing an example of switching between the images and the switching moving image according to this embodiment.

As shown in (C) of FIG. 10, the second image 112b is an image obtained by capturing the corridor 45 of the building 40 in a direction from the front to the entrance 43. Thus, a moving image in which the first region image 151a is slightly rotated and faces the front is generated and displayed as the first moving image 160. Further, a moving image in which the first region image 151a is moved, reflecting the positional relevance between the first and second imaging spaces, to a position of the second region 150b in the second image 112b is generated.

To (C) of FIG. 10, a region 156 other than a second region image 151b is gradually displayed. With this, the display of the first moving image 160 is terminated and switching to the second image 112b is terminated. The first moving image 160 is generated and displayed, such that it becomes possible to easily understand a spatial positional relationship between the first and second images 112a and 112b. As shown in (A) of FIG. 11, the display of the second region image 151b is released when the person 3 moves away from the second region 150b.

In switching from the second image 112b to the second image 112a, the second moving image to reverse the first moving image 160 is generated.

Subsequently, the second image 112b shown in (A) of FIG. 11 will be referred to as a first image 212a and switching between this first image 212a and a second image 212b shown in (C) of FIG. 14 will be described.

Figure 11:
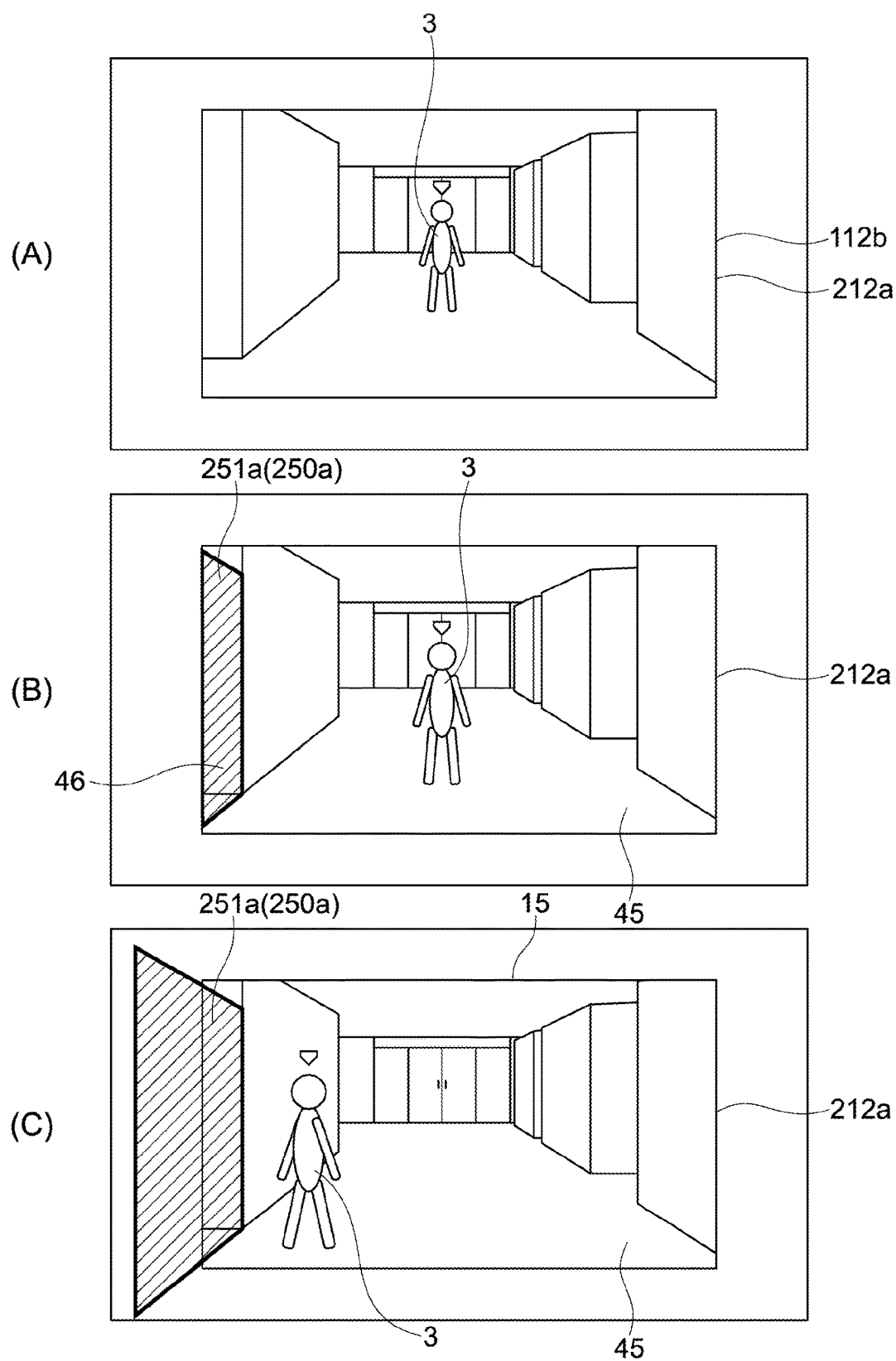
FIG. 11 A diagram showing an example of switching between the images and the switching moving image according to this embodiment.

As shown in (B) of FIG. 11, the person 3 advances through the corridor 45. In the first image 212a, the corridor 45 extends bending to the right for the person 3 advancing through the corridor 45 (left in figure). At a corner portion 46 of the corridor 45, the first region 250a is set. When the person 3 approaches the first region 250a, a first region image 251a is displayed. The first region 250a and a second region 250b shown in (C) of FIG. 14 are the common region.

Figure 12:
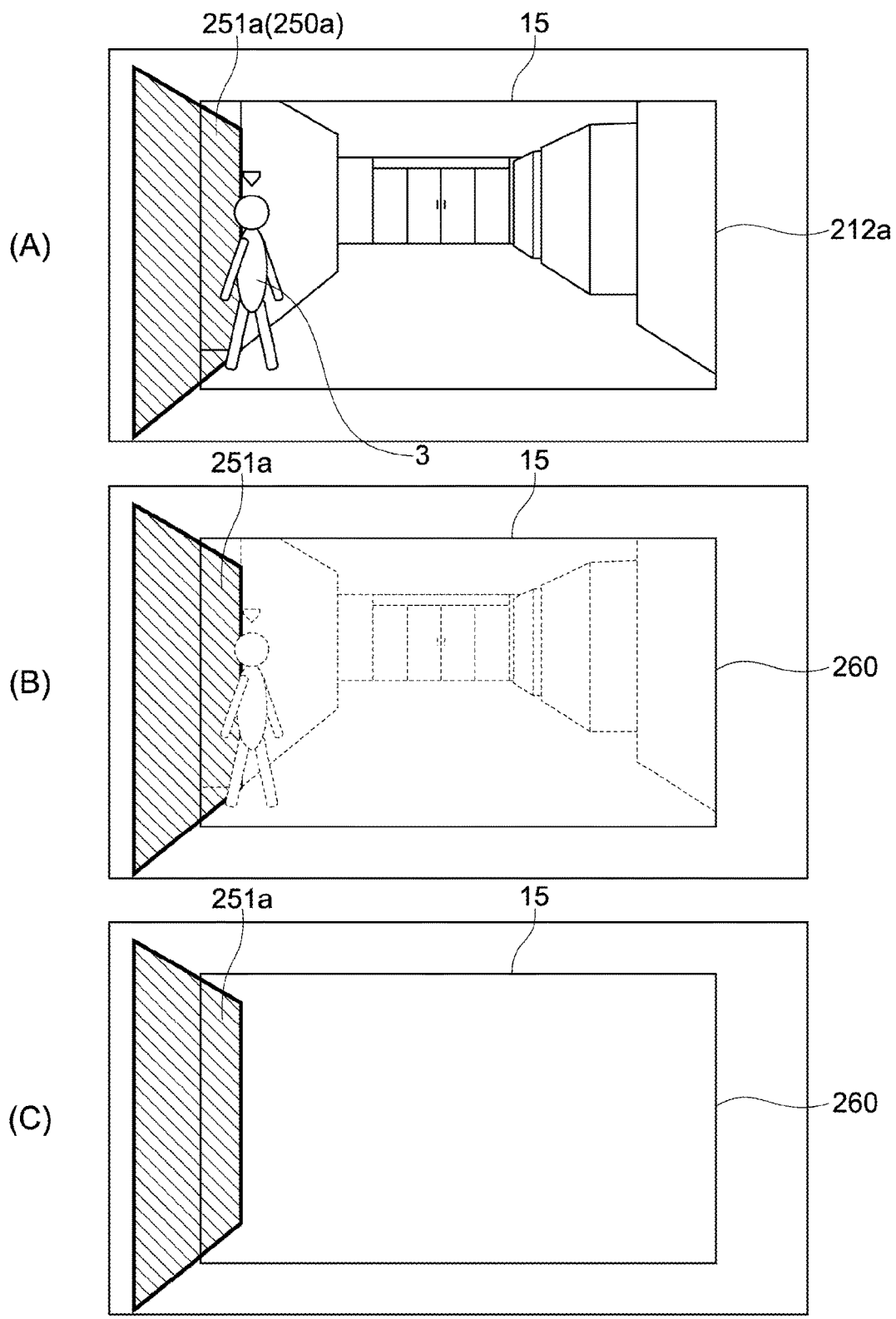
FIG. 12 A diagram showing an example of switching between the images and the switching moving image according to this embodiment.
Figure 13:
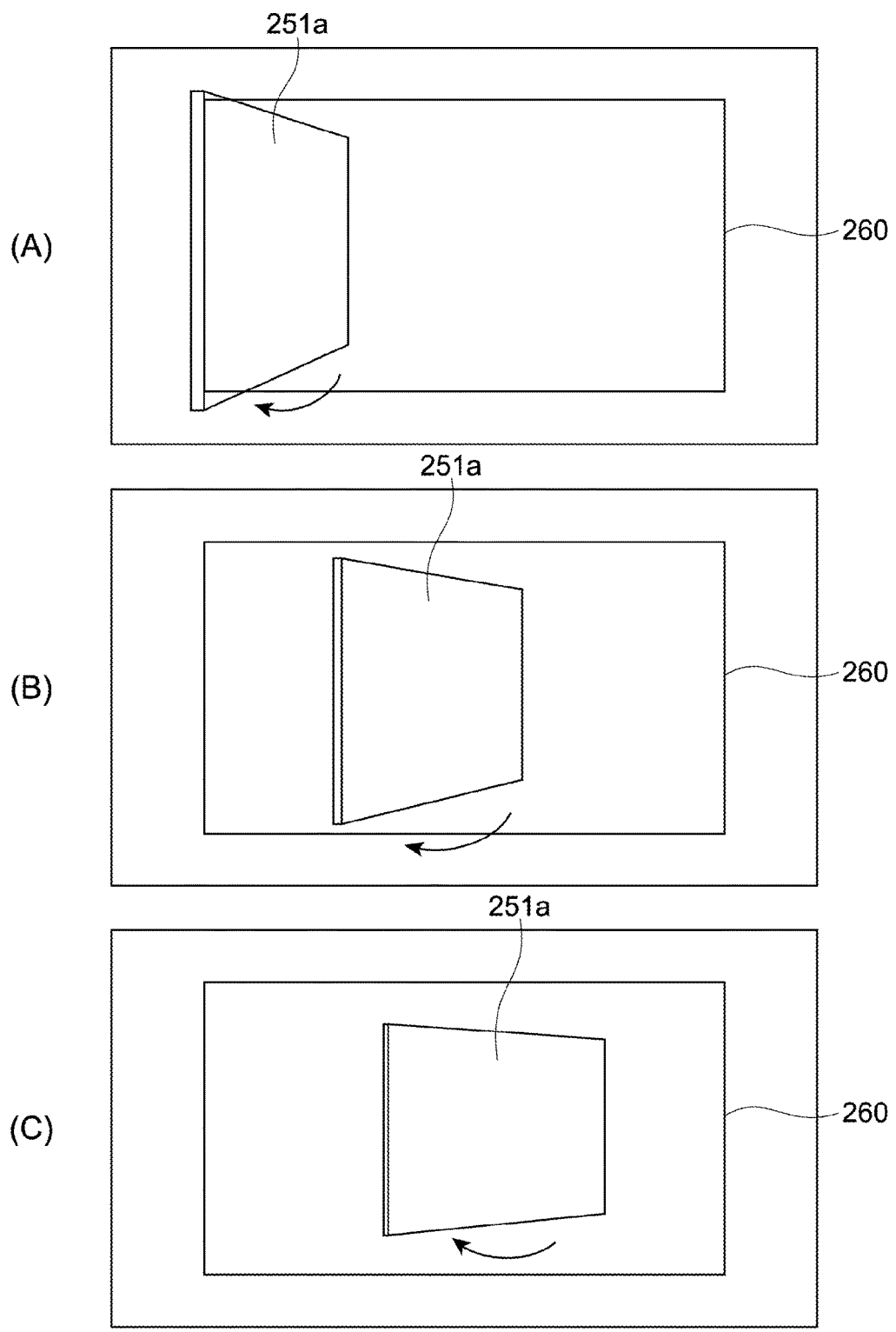
FIG. 13 A diagram showing an example of switching between the images and the switching moving image according to this embodiment.

As shown in (A) of FIG. 12, when the person 3 further approaches the first region 250a, the first region image 251a is changed and switching to the second image 212b is started. As shown in (B) and (C) of FIG. 12, the moving image in which the first region image 251a is emphasized is displayed. In (C) of FIG. 11 and the pictures of FIG. 12, the first region image 251a is shown extending to an outside of a screen 15. This expresses a region corresponding to the second region 250*b* of the second image 212*b*. Actually, a portion in the screen 15 is displayed as the first region image 251*a*.

Figure 14:
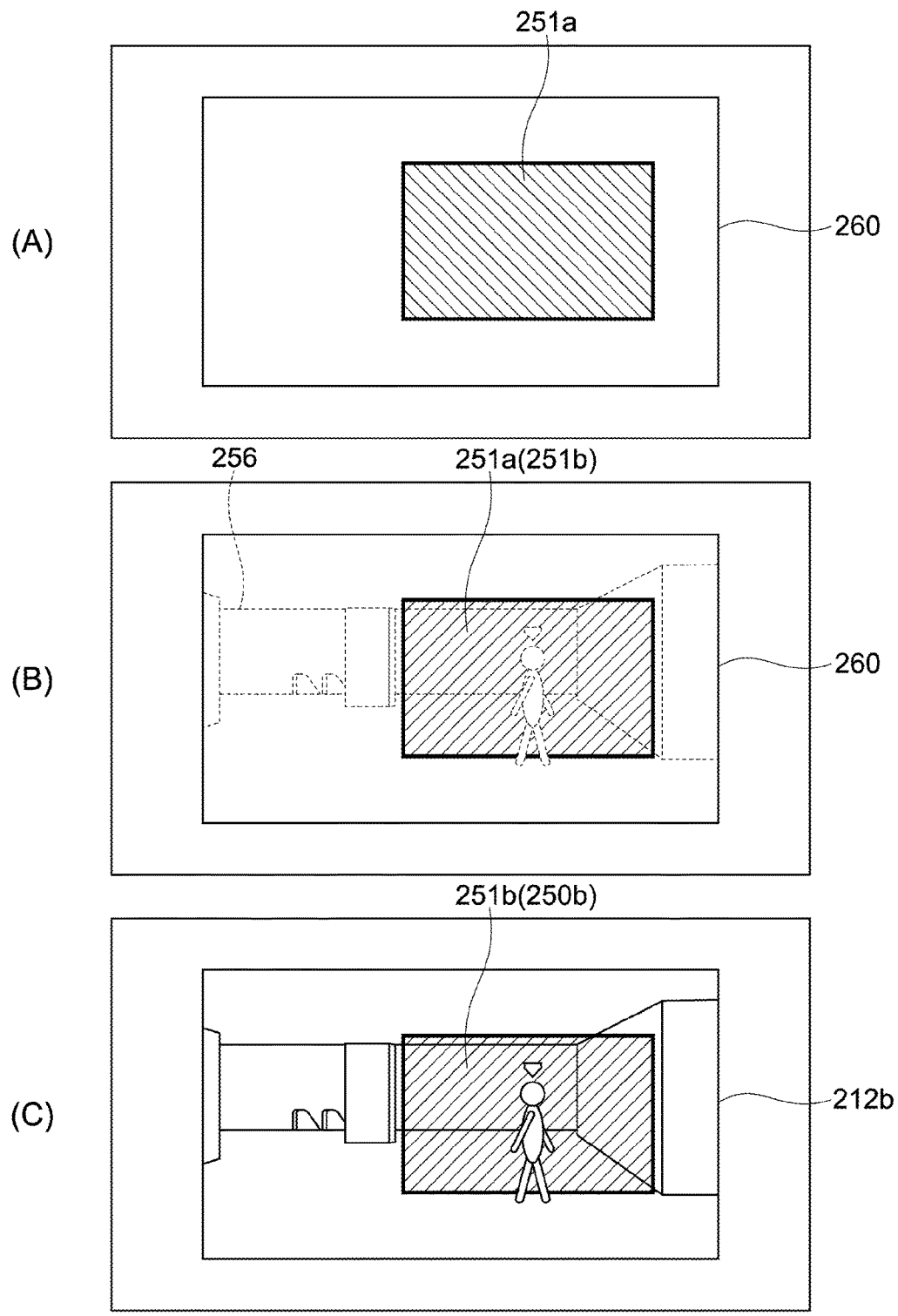
FIG. 14 A diagram showing an example of switching between the images and the switching moving image according to this embodiment.

To (A) of FIG. 14, a first moving image 260 that is moved reflecting the positional relevance between the first and second imaging spaces is displayed. As shown in (A) of FIG. 13, as the first region image 251*a* is moved, the entire region corresponding to the above-mentioned second region 250*b* is displayed as the first region image 251*a*. While being moved and rotated, the first region image 251*a* is moved to a position of the second region 250*b* that is the common region.

As shown in (B) of FIG. 14, a region 256 other than a second region image 251*b* is gradually displayed. With this, the second image 212*b* with a space expanding from the corner portion 46 of the corridor 45 being an imaging space is displayed. As shown in (A) of FIG. 15, the display of the second region image 251*b* is released when the person 3 moves away from the second region 250*b*.

Subsequently, assuming that the second image 212*b* shown in (A) of FIG. 15 will be referred to as a first image 312*a*, switching between this first image 312*a* and a second image 312*b* shown in (B) of FIG. 19 will be described.

Figure 15:
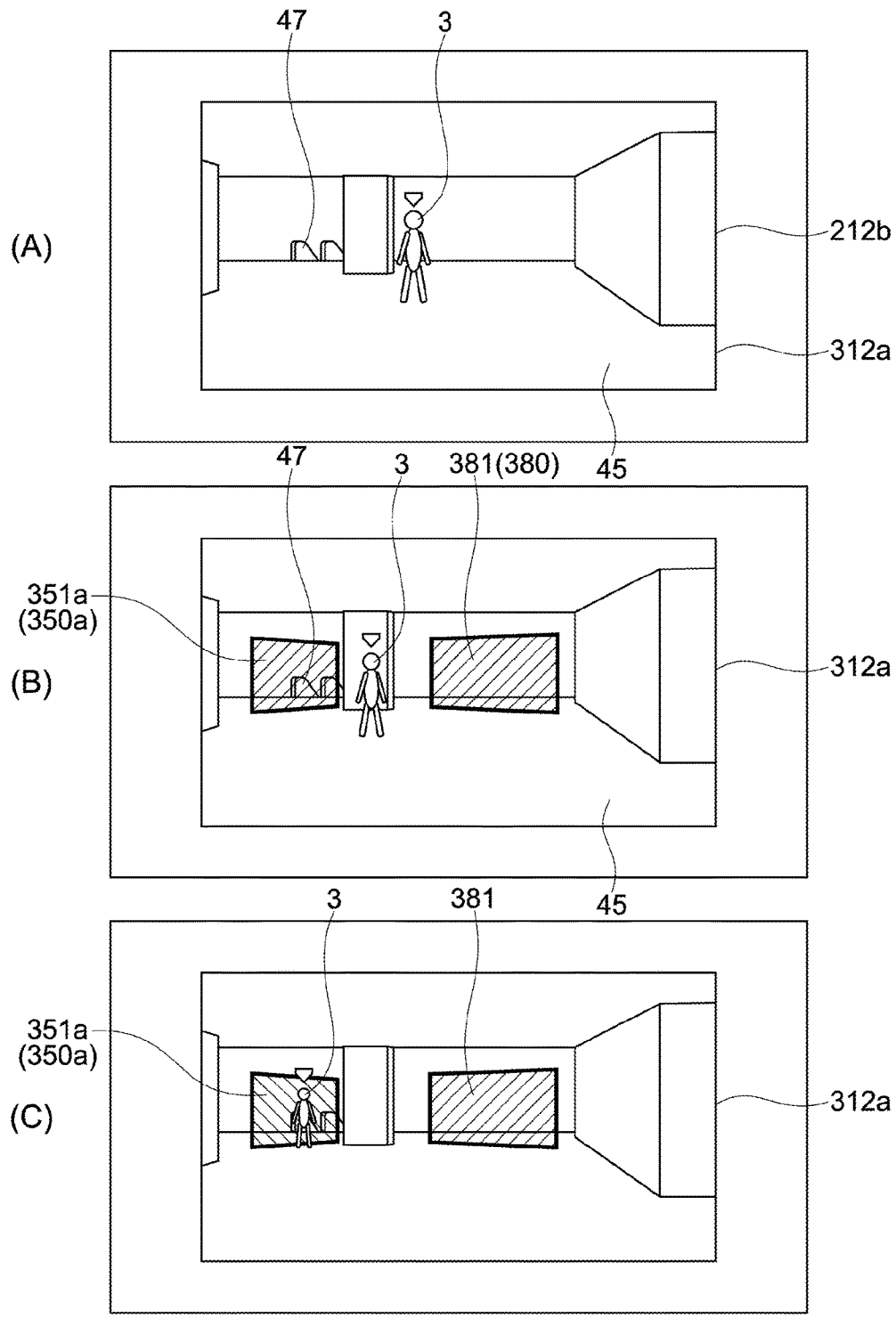
FIG. 15 A diagram showing an example of switching between the images and the switching moving image according to this embodiment.
Figure 16:
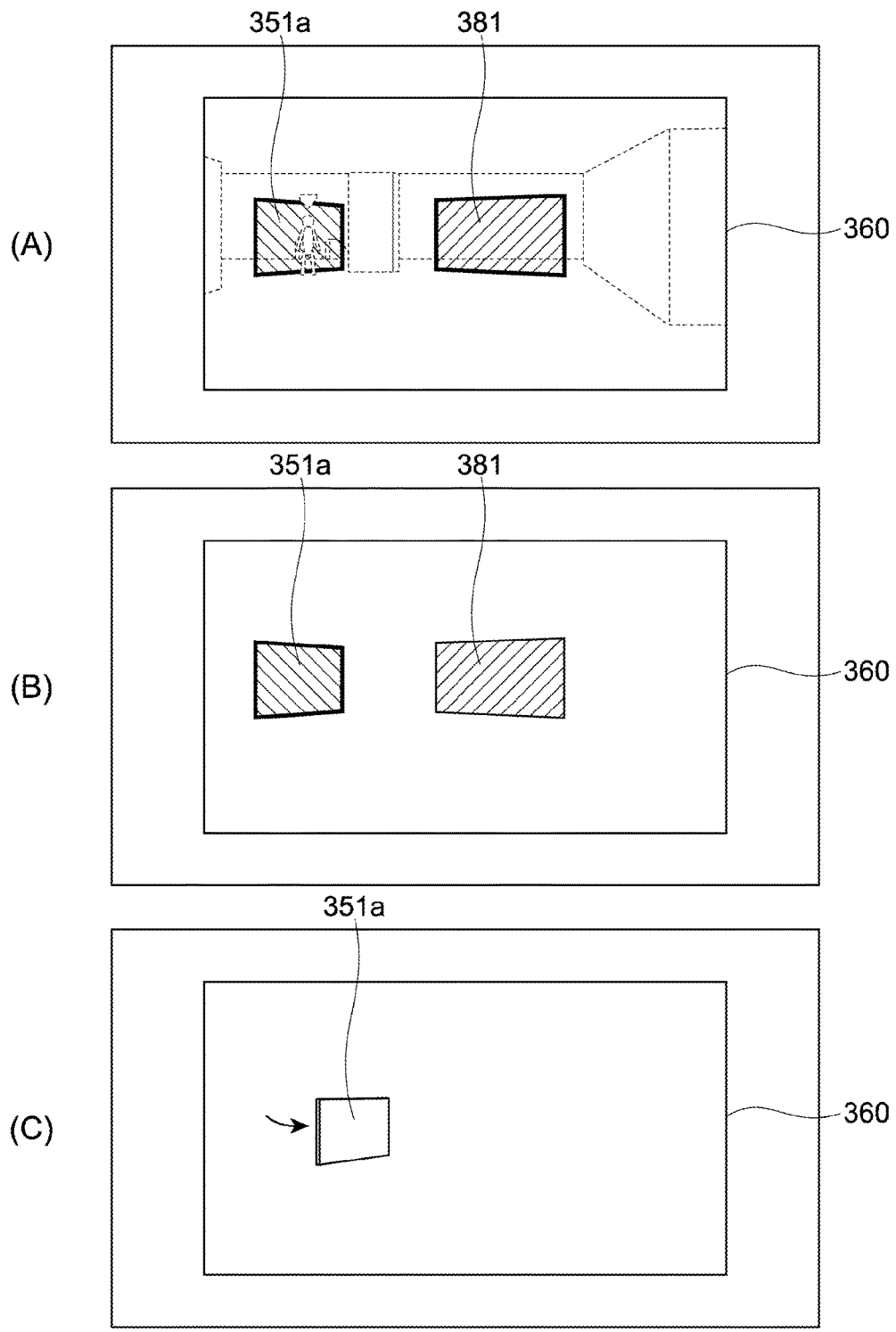
FIG. 16 A diagram showing an example of switching between the images and the switching moving image according to this embodiment.
Figure 17:
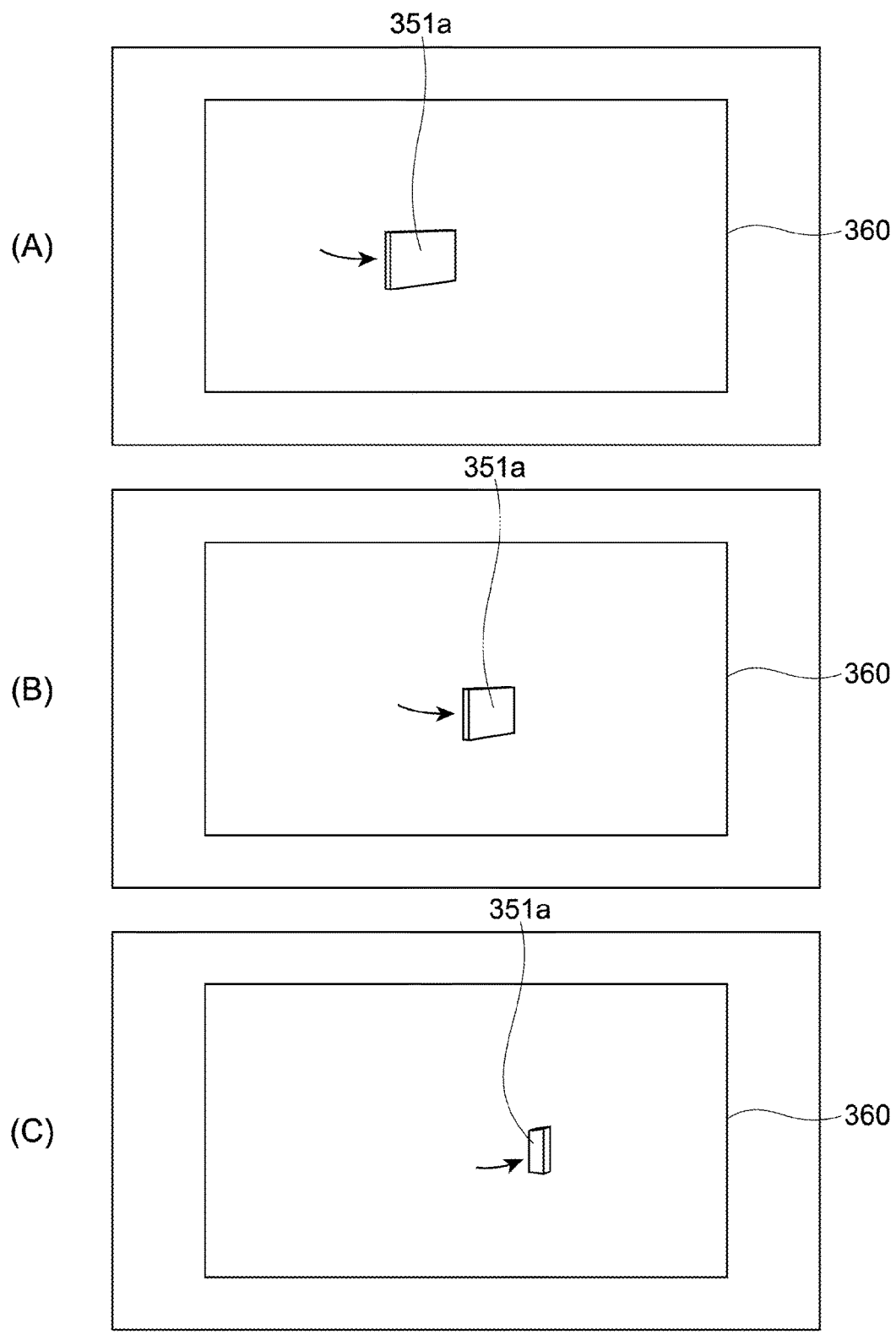
FIG. 17 A diagram showing an example of switching between the images and the switching moving image according to this embodiment.

As shown in (B) of FIG. 15, the person 3 advances to an escalator 47 on the rear left side of the corridor 45. Then, two first region images 351*a* and 381 are displayed. That is, in the first image 312*a*, two regions of a front region of the escalator 47 and a region on the rear right side of the corridor 45 are set as first regions 350*a* and 380. These images are displayed as the first region image 351*a* and 380.

Figure 19:
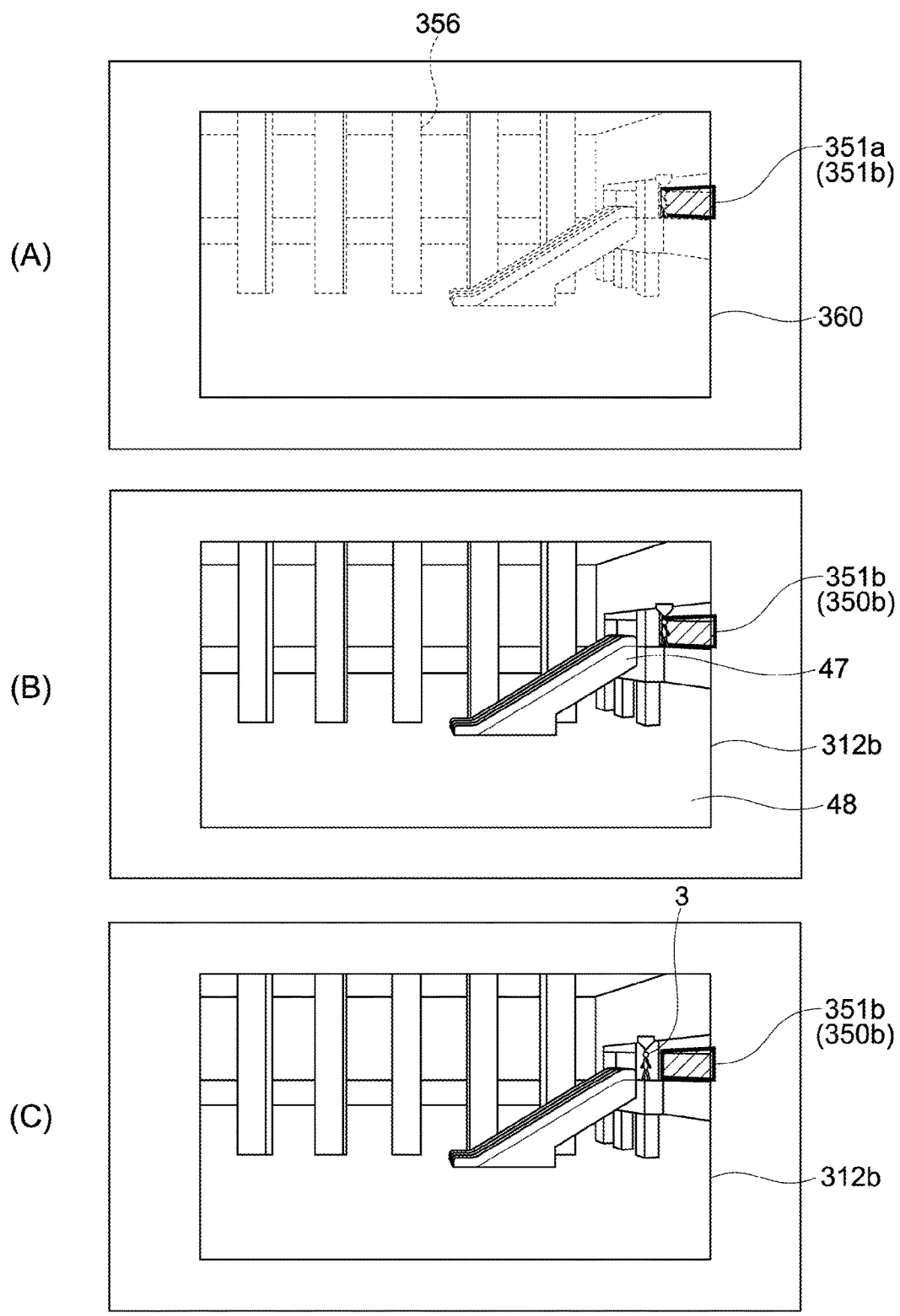
FIG. 19 A diagram showing an example of switching between the images and the switching moving image according to this embodiment.

The first region image 351*a* displayed in front of the escalator 47 is a first region image for switching to the second image 312*b* shown in (B) of FIG. 19. The first region image 381 displayed on the rear right side of the corridor 45 is used for switching to/from a image captured by a camera set beyond it. Two first region images 351*a* and 381 are displayed and hence the user can know the number or positions of switching points between the images.

Figure 9:
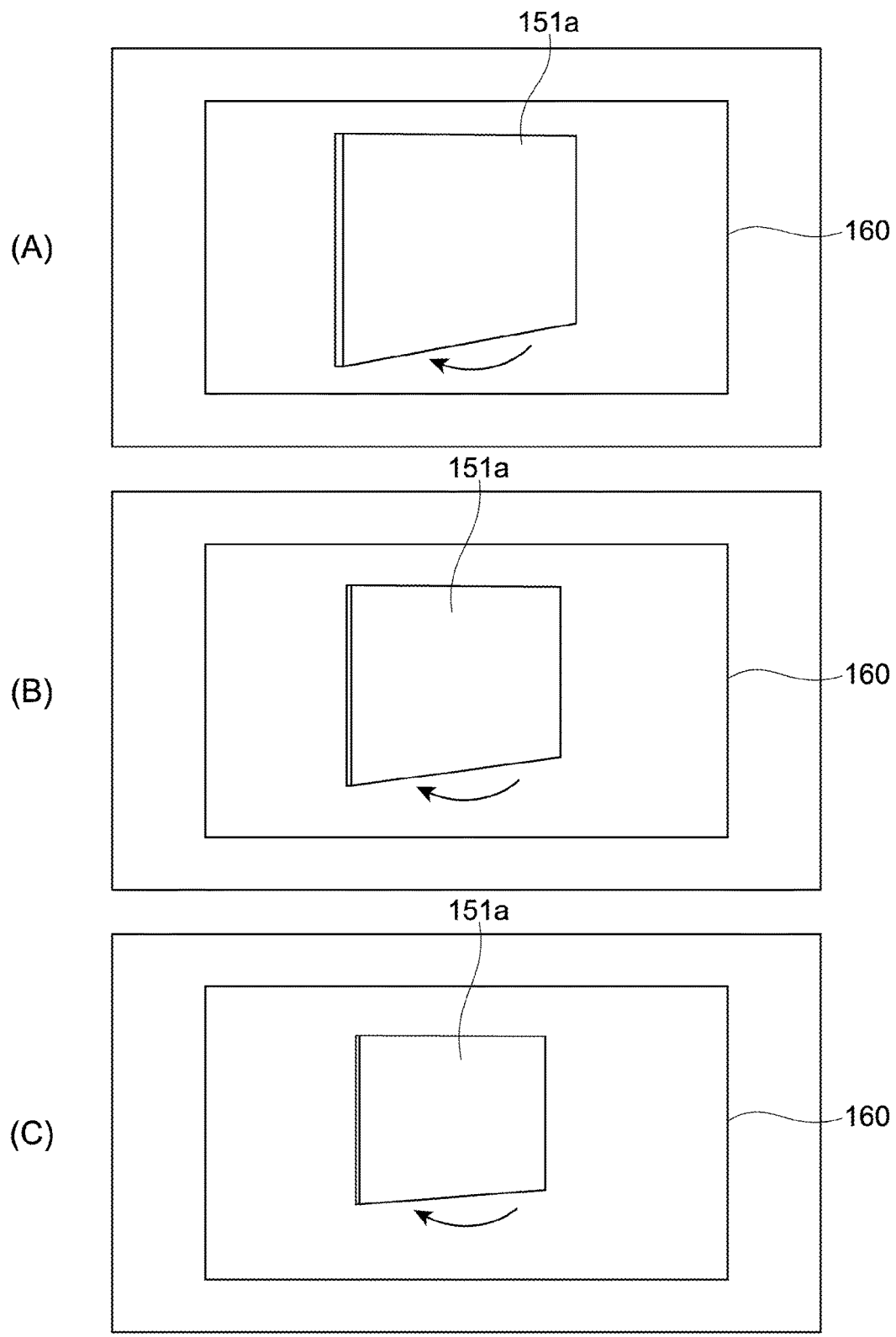
FIG. 9 A diagram showing an example of switching between the images and the switching moving image according to this embodiment.

Note that the first region 350*a* and the second region 350*b* shown in (C) of FIG. 9 are set as a common region.

As shown in (C) of FIG. 15, when the person 3 further approaches the first region 350*a*, the first region image 351*a* is changed and switching to the second image 312*b* is started. As shown in (A) and (B) of FIG. 16, a moving image in which the first region image 351*a* is emphasized is displayed. At this time, another first region image 381 may be displayed as it is without changes.

Figure 18:
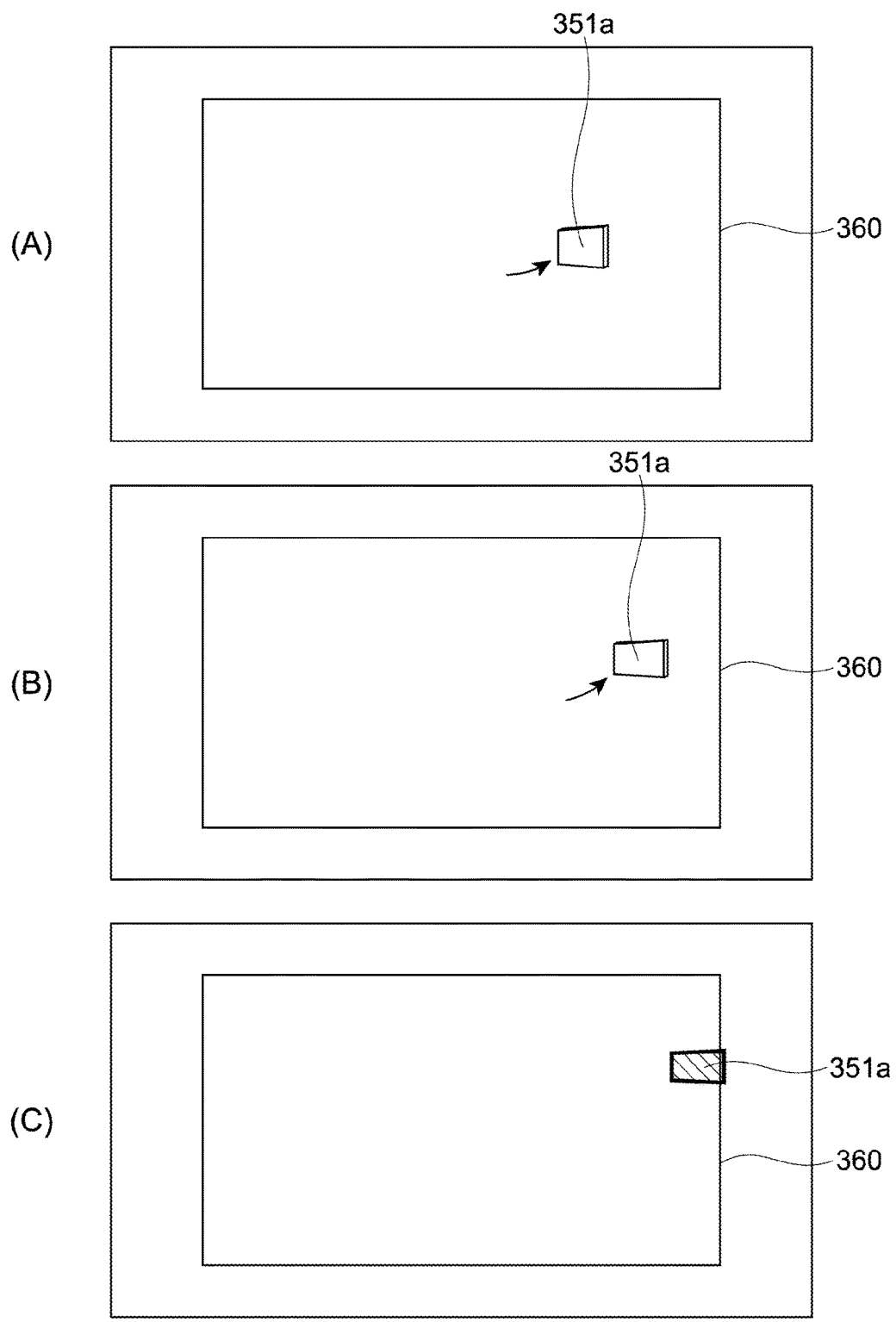
FIG. 18 A diagram showing an example of switching between the images and the switching moving image according to this embodiment.

To (C) of FIG. 18, a first moving image 360 that is moved reflecting the positional relevance between the first and second imaging spaces is displayed. As shown in (B) of FIG. 19, the second image 312*b* is an image in which an entire large open space 48 below the escalator 47 is captured. That is, it is an image in which a large imaging space is captured as the imaging target. Thus, the second region 350*b* set as the common region is a small region in the second image 312*b*.

Thus, as the first moving image 360, a moving image in which the first region image 351*a* is moved to a position of the second region 350*b* while being rotated and moved and being reduced in size is generated. To (B) of FIG. 19, an image of a region 356 other than a second region image 351*b* is gradually displayed. With this, the second image 312*b* in which the entire open space 48 is displayed is displayed. As shown in (C) of FIG. 19 and (A) of FIG. 20, the display of the second region image 351*b* is released when the person 3 moves away from the second region 350*b* such that the distance therebetween is equal to or larger than a predetermined distance.

Figure 20:
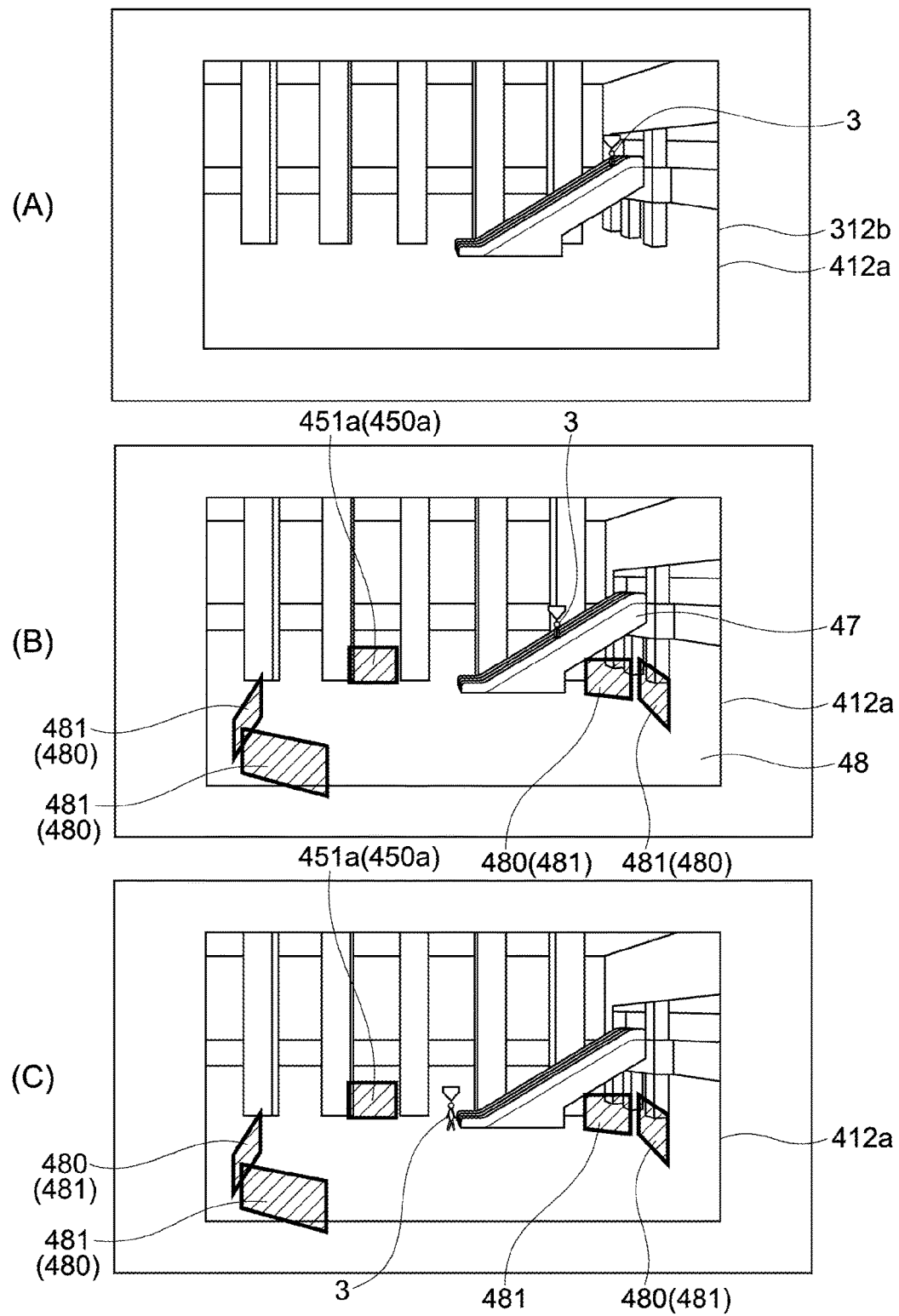
FIG. 20 A diagram showing an example of switching between the images and the switching moving image according to this embodiment.

The description will be continued assuming that the second image 312*b* shown in (A) of FIG. 20 is a first image 412*a*. As shown in (B) of FIG. 20, the person 3 goes down to the open space 48, using the escalator 47. Then, a plurality of first region images 451*a* and 481 are displayed. It is possible to advance in a plurality of directions from the open space 48 and cameras are set in each of the advancing directions. The plurality of first region images 451*a* and 481 are displayed for switching to/from images captured by these cameras.

In (B) of FIG. 20, when the person 3 comes to an almost central position of the escalator 47, fives first region images 451*a* and 481 set in the open space 48 are displayed. That is, the five first region images 451*a* and 481 are all displayed at a stage where the distance to the person 3 is relatively large. With this, the user can understand the number or positions of switching points in the first image 412*a* obtained by capturing the entire open space 48 at an early stage.

Figure 21:
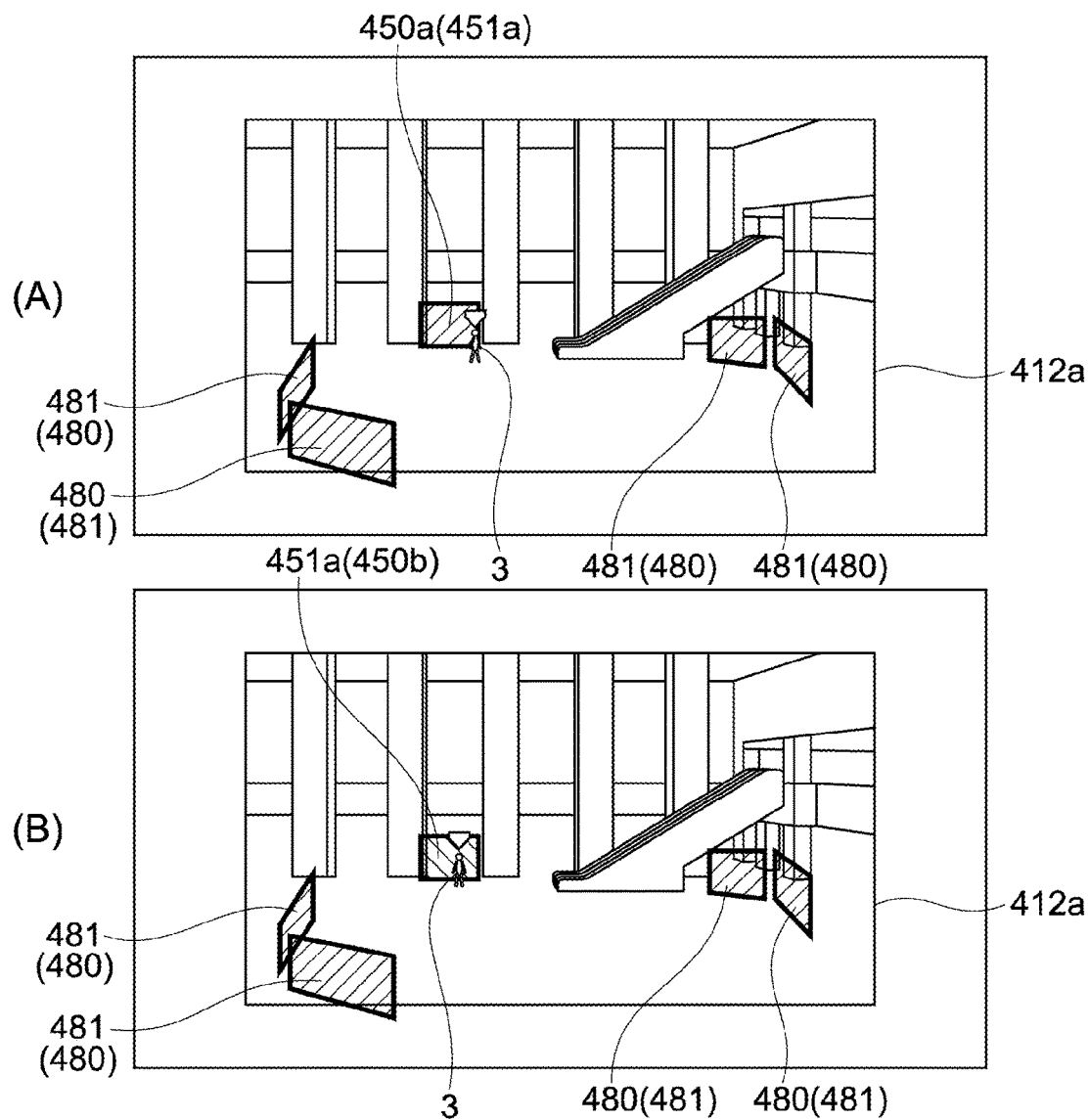
FIG. 21 A diagram showing an example of switching between the images and the switching moving image according to this embodiment.

To (B) of FIG. 21, out of the five first region images 451*a* and 481, the first region image 451*a* that the person 3 approaches within the predetermined distance is changed and processing of switching between the images is started.

Figure 22:
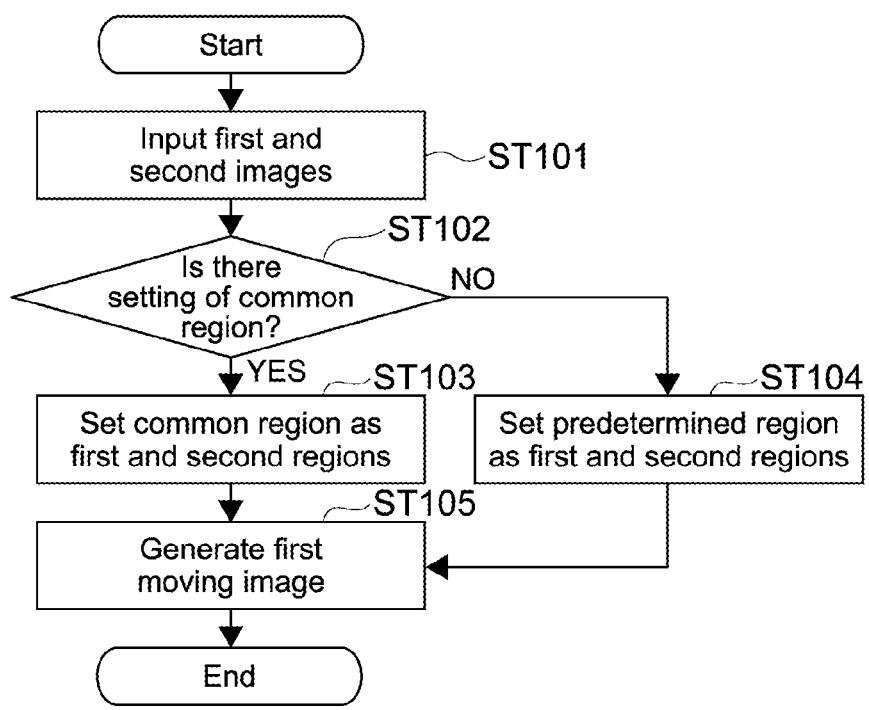
FIG. 22 A diagram showing an example of switching between the images and the switching moving image according to this embodiment.

FIG. 22 is a flowchart showing an example of processing for generating a switching moving image according to this embodiment. Here, generation of the first moving image that is the switching moving image from the first image to the second image will be described.

The first and second images are input (Step 101). It is judged whether or not the common region captured in common between the first and second images is set (Step 102). If the setting of the common region is present (Yes), this common region is set as each of the first and second regions (Step 103). If the setting of the common region is not present (No), a predetermined region is set as each of the first and second regions based on the positional relevance between the first and second imaging spaces (Step 104).

The judgment as to whether or not the common region is present and the setting of the first and second regions are typically performed as calibration processing when the monitoring camera system 100 is placed. That is, the user, a provider of the monitoring camera system 100, or the like performs setting or the like of the first and second regions based on the imaging space of each camera. However, based on information on camera-installed positions, information on various imaging settings of the cameras, or the like, the setting of the first and second regions may be automatically performed.

Based on the set first and second regions, the first moving image is generated. If the first and second regions are set as the common region, the moving image in which the first region image is moved to the position of the second region, the first moving image is generated. If the first and second regions are not set as the common region, the moving image in which the first region image is moved reflecting the positional relevance between the first and second imaging spaces is appropriately generated as the first moving image.

Figure 23:
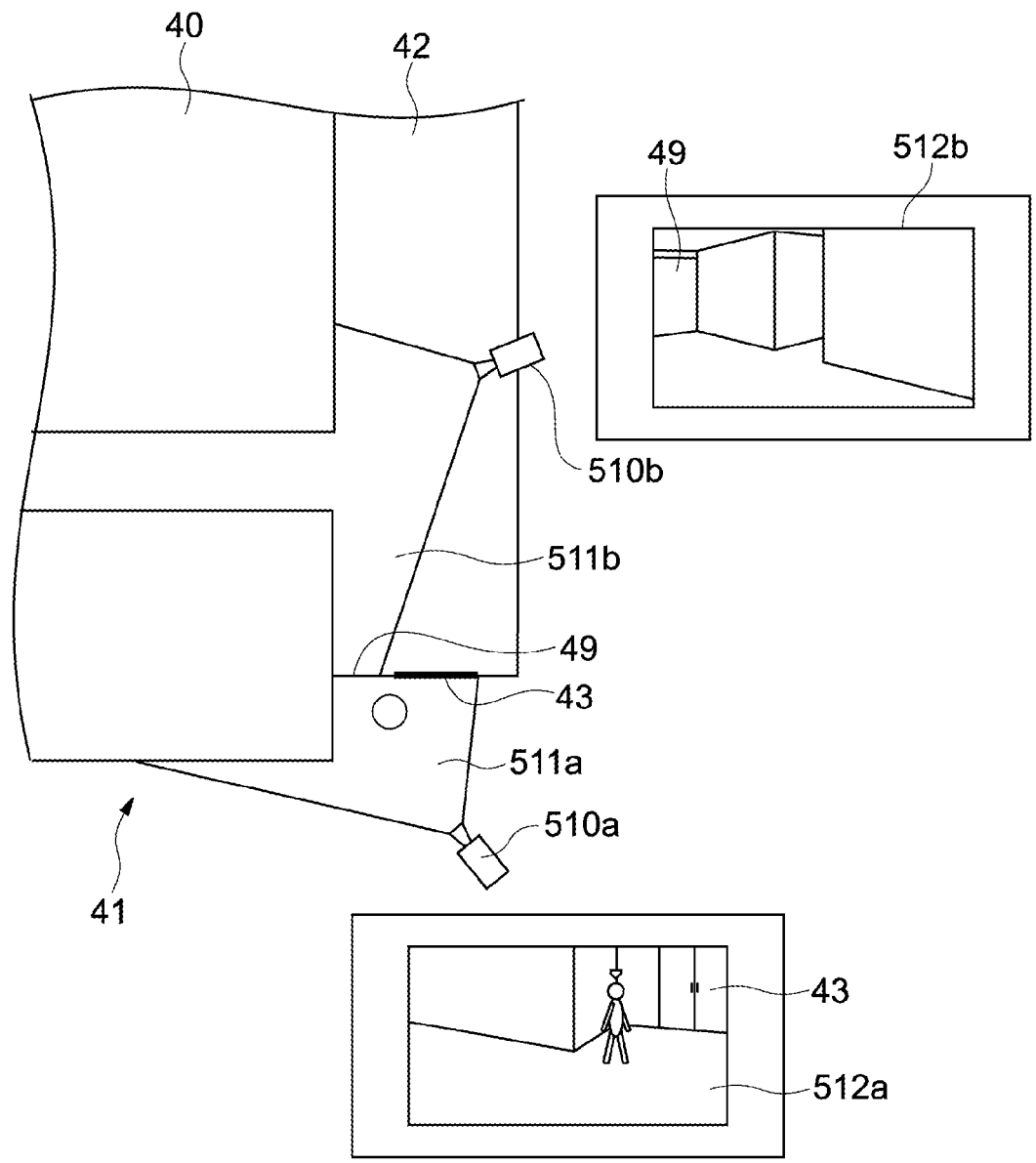
FIG. 23 A schematic diagram showing an arrangement example of cameras in the case where a common region is not set in each of the first and second images.

FIG. 23 is a schematic diagram showing an arrangement example of cameras if the common region is not set in each of the first and second images. It is assumed that a first imaging space 511*a* of a first camera 510*a* is the same as the first imaging space 11*a* of the first camera 10*a* shown in FIG. 2. A second imaging space 511*b* of a second camera 510*b* placed in the inside 42 of the building 40 is set in a space not including the entrance 43. Note that it can also be assumed that a portion 49 of a second image 512*b*, which is adjacent to the entrance 43 as a right end, is set as the common region.

However, there is a difference between the outside 41 and the inside 42 of the building 40 and hence that part is not set as the common region.

Figure 24:
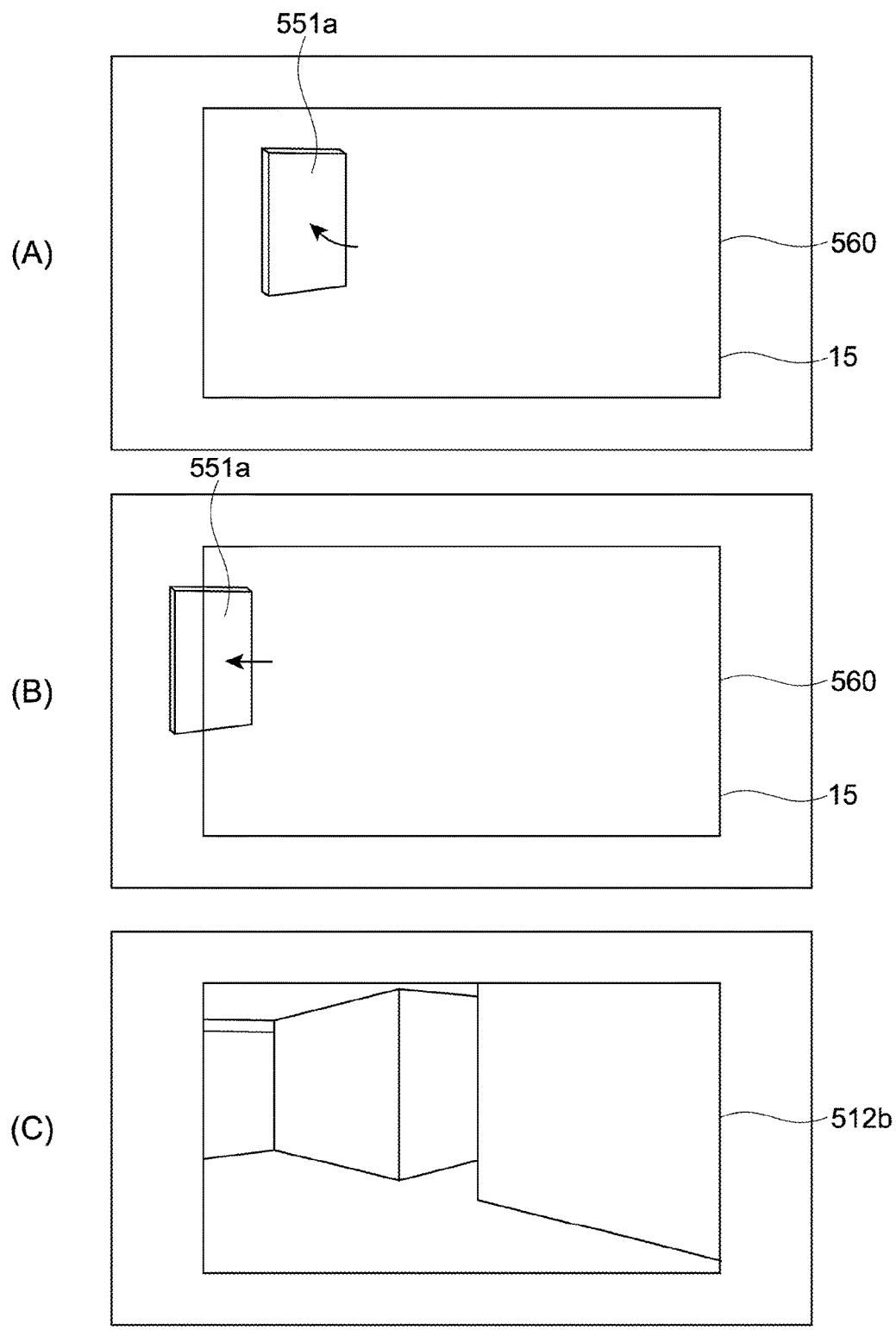
FIG. 24 A diagram showing an example of switching between images and a switching moving image in the case shown in FIG. 23.

Regarding such a case, an example of the first and second moving images will be shown. First, as a first region of a first image 512*a*, it is set in the same manner as the first region 50*a* shown in (B) of FIG. 3. Then, a moving image similar to the first moving image 60 shown in (B) of FIG. 3 to (A) of FIG. 6 is displayed. Subsequently, as shown in (A) to (C) in FIG. 24, a moving image in which a first region image 551*a* is moved to a position of the entrance 43 in a left-hand direction of the screen 15 is displayed. That is, a moving image in which the first region image 551*a* is moved to the position of the entrance 43 in the second image 512*b* to an outside of the screen 15 is displayed. This moving image is generated and displayed as a first moving image 560. Then, switching to the second image 512*b* is completed.

Figure 25:
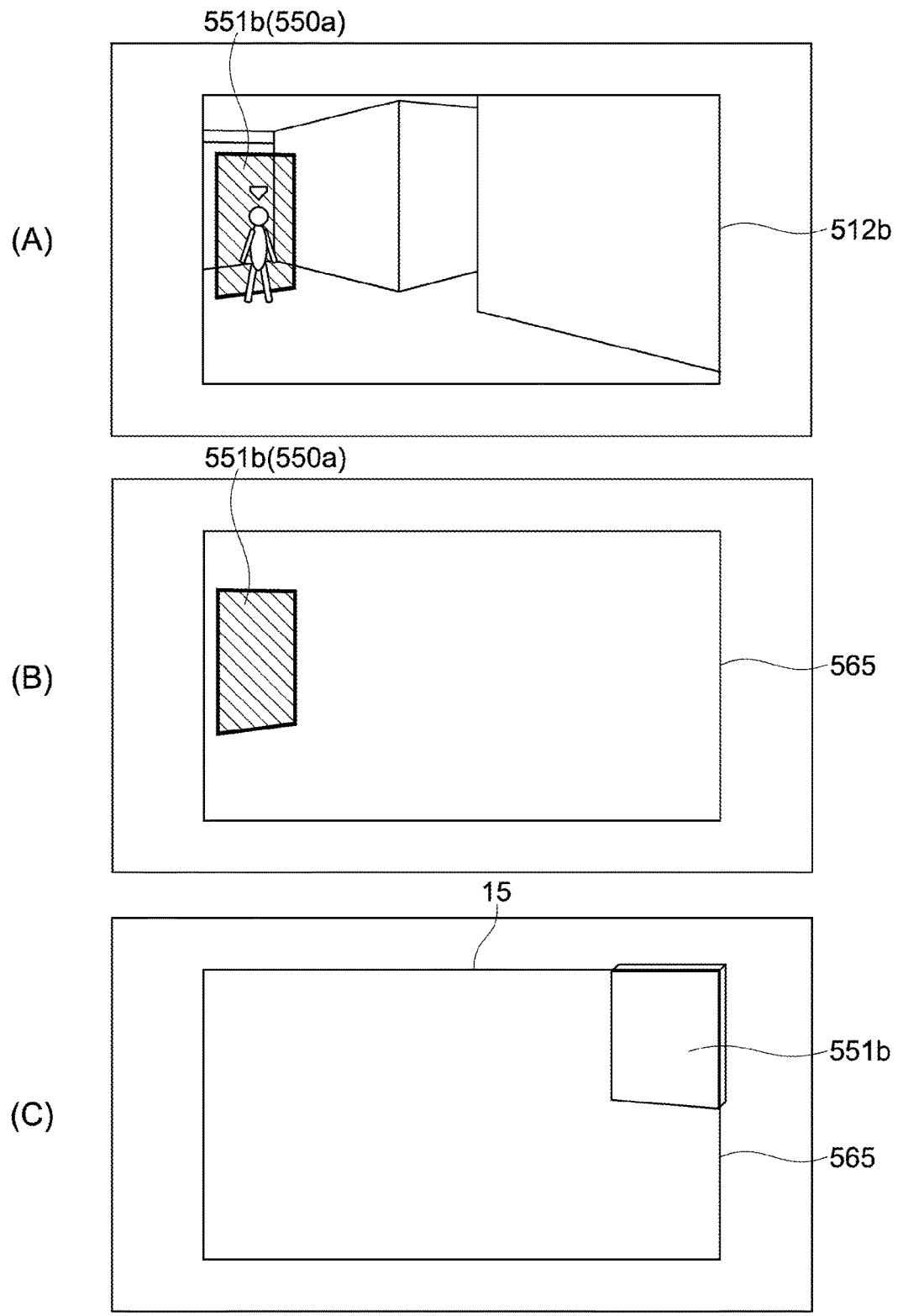
FIG. 25 A diagram showing an example of switching between the images and the switching moving image in the case shown in FIG. 23.
Figure 26:
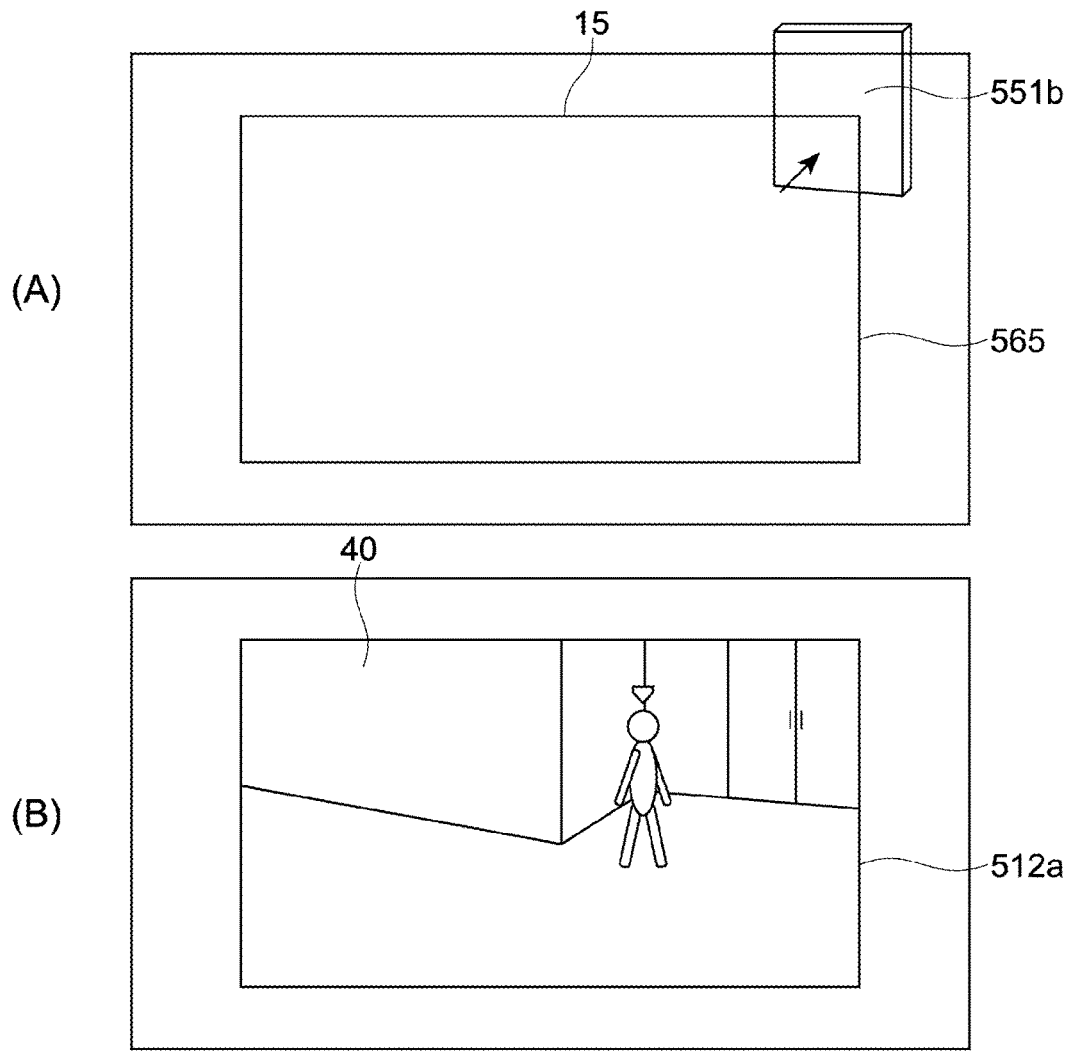
FIG. 26 A diagram showing an example of switching between the images and the switching moving image in the case shown in FIG. 23.

In the second image 512*b*, for example, as shown in (A) and (B) of FIG. 25, a second region 550*a* is set in a region on a left-hand side of the second image 512*b*. Then, a moving image almost similar to the second moving image 65 shown in (A) of FIG. 6 to (C) of FIG. 4 is displayed. Subsequently, as shown in (C) of FIG. 25 to (B) of FIG. 26, a moving image in which a second region image 551*b* is moved to the inside 42 of the building 40 to an upper right side of the screen 15 is displayed. That is, a moving image in which the second region image 551*b* is moved to a position of a second region 550*b* in the first image 512*a* to the outside of the screen 15 is displayed. This moving image is generated and displayed as a second moving image 565. Then, switching to the first image 512*a* is completed.

In this manner, if the common region is not set, for example, the first and second moving images 560 and 565 in which first and second region images 551*a* and 552*b* are moved to the outside of the screen 15 may be generated. With this, it becomes possible to generate the switching moving image reflecting the positional relevance between the imaging spaces.

As described above, in the monitoring camera system 100 according to this embodiment, the first image of the first imaging space and the second image of the second imaging space are input into the server apparatus 20. Then, when the first and second images are switched, the switching moving image reflecting the positional relevance between the first and second imaging spaces is output. With this, it is possible to easily understand a spatial relevance when the first and second images are switched. As a result, it becomes possible to realize a useful monitoring camera system 100.

Further, in the monitoring camera system 100 according to this embodiment, the first and second region images are automatically displayed according to a motion of the tracking target object 4. Further, according to the motion of the tracking target object 4, switching between the first and second images is automatically performed. With this, it becomes possible to efficiently track the tracking target object 4. Further, it is possible to prevent the tracking target object 4 from being lost during switching between the images. As a result, it is possible to realize a useful monitoring camera system 100.

When the plurality of images captured by the plurality of cameras 10 are frequently switched, the movement of the line of sight of the user increases and it becomes difficult to understand the spatial relevance between the images to be switched. In the monitoring camera system 100 according to this embodiment, generation of such a problem can be suppressed.

Figure 27:
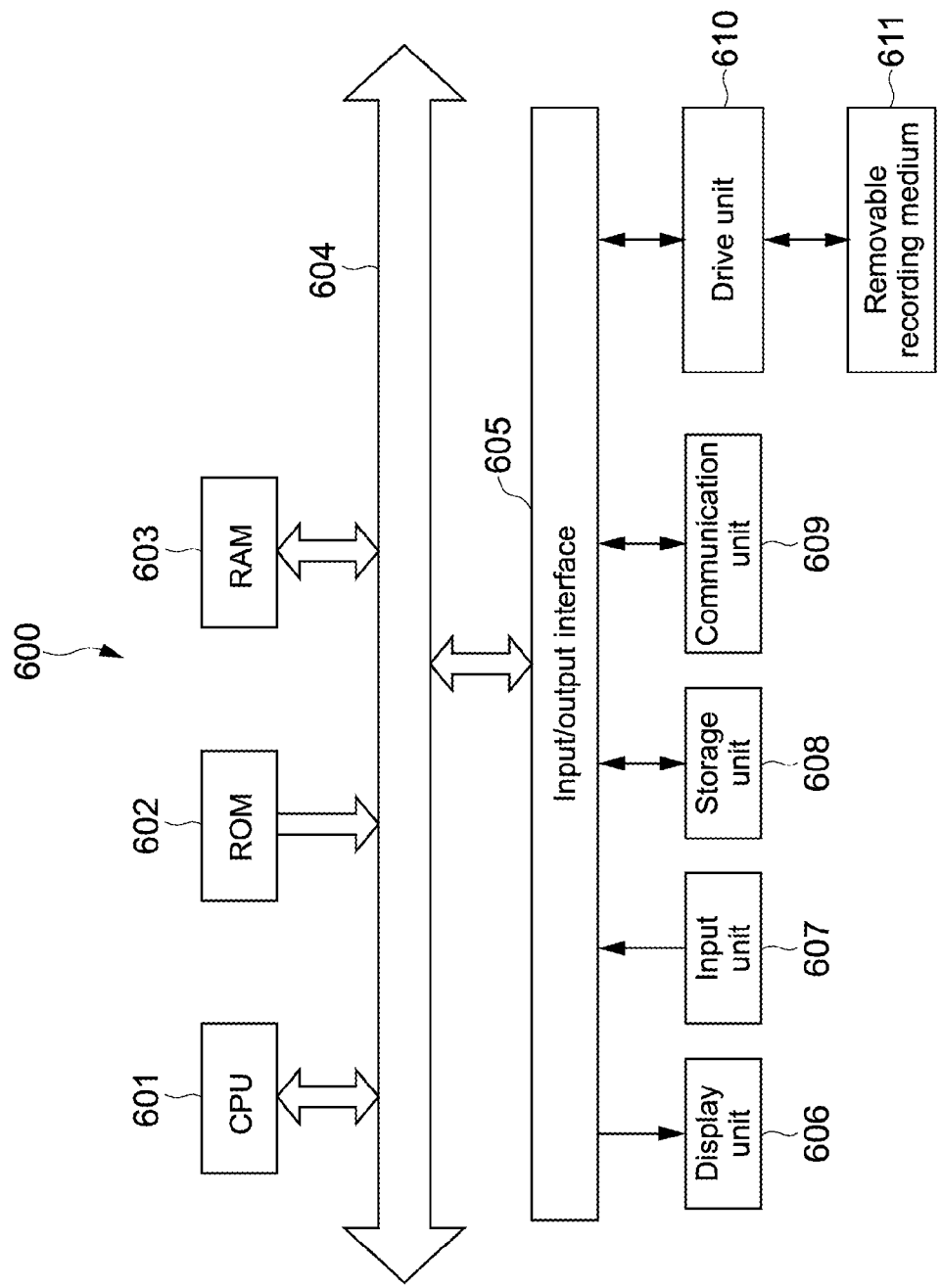
FIG. 27 A schematic block diagram showing a configuration example of a computer used as a client apparatus and a server apparatus.

In the above-mentioned embodiments, for example, various computers such as a PC (Personal Computer) are used as the client apparatus 30 and the server apparatus 20. FIG. 27 is a schematic block diagram showing a configuration example of such computers.

The computer 600 includes a CPU (Central Processing Unit) 601, a ROM (Read Only Memory) 602, a RAM (Random Access Memory) 603, an input/output interface 605, and a bus 604 that connects them to one another.

To the input/output interface 605, connected are a display unit 606, an input unit 607, the storage unit 608, a communication unit 609, a drive unit 610, and the like.

The display unit 606 is a display device using, for example, crystal, EL (Electro-Luminescence), or CRT (Cathode Ray Tube).

The input unit 607 is, for example, a controller, a pointing device, a keyboard, a touch panel, or another operation apparatus. If the input unit 607 includes a touch panel, the touch panel can be integrated with the display unit 606.

The storage unit 608 is a non-volatile storage device and, for example, an HDD (Hard Disk Drive), a flash memory, or another solid-state memory.

The drive unit 610 is, for example, a device capable of driving a removable recording medium 611 such as an optical recording medium, a floppy (registered trademark) disc, a magnetic recording tape, and a flash memory. In contrast, the above-mentioned storage unit 608 is often used as a device that is installed in the computer 600 in advance to mainly drive a non-removable recording medium.

The communication unit 609 is a modem, a router, or another communication apparatus for communicating another device, which is connectable to a LAN, a WAN (Wide Area Network), and the like. The communication unit 609 may perform a wired communication or may perform a wireless communication. The communication unit 609 is often used separately from the computer 600.

The information processing by the computer 600 having the hardware configuration as described above is realized by cooperation of software stored in the storage unit 608, the ROM 602, or the like and a hardware resource of the computer 600. Specifically, it is realized by the CPU 601 loading programs constituting the software, which are stored in the storage unit 608, the ROM 602, or the like into the RAM 603 and executing it. For example, the respective blocks shown in FIG. 2 are realized by the CPU 601 performing a predetermined program.

The program is, for example, installed into the computer 600 via a recoding medium. Alternatively, the program may be installed into the computer 600 via global network or the like.

Further, the program executed by the computer 600 may be a program in which processes are performed in a time series in the above-mentioned order or may be a program in which processes are in parallel or at a necessary timing, for example, when called.

<Other Embodiments>

The present technology is not limited to the above-mentioned embodiments and various other embodiments can realized.

Figure 28:
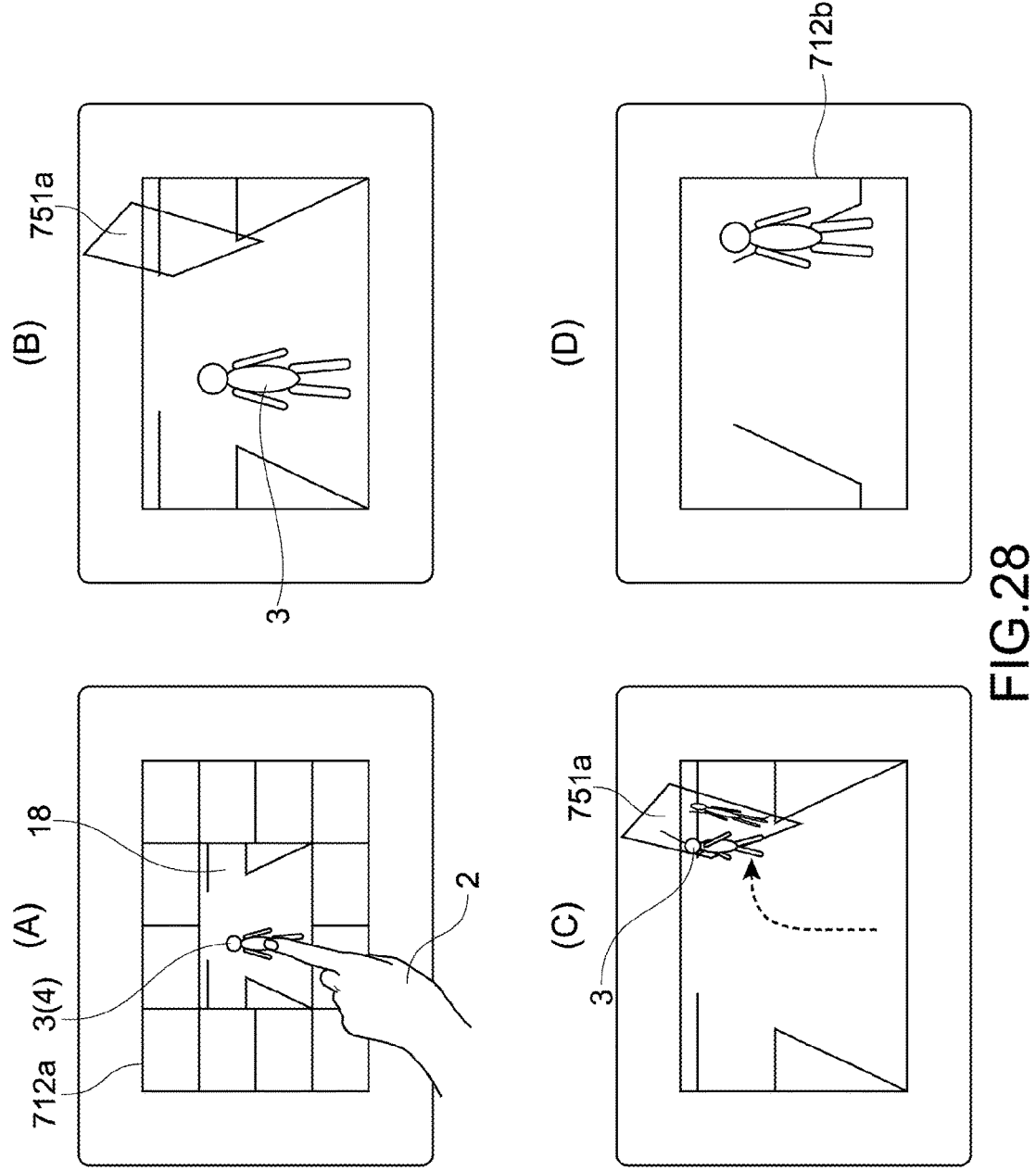
FIG. 28 A schematic diagram for describing processing of switching between the first and second images serving as another embodiment.

For example, FIGS. 28 and 29 are schematic diagrams for describing the processing of switching between the first and second images as another embodiment. As shown in (A) of FIG. 28, the person 3 as the object in a first image 712*a* is set as the tracking target object 4 by a user 2. In this embodiment, by a touch operation with respect to the person 3 via a touch panel 18, the tracking target object 4 is set.

As shown in (B) of FIG. 28, a first region image 751a is displayed according to a motion of the person 3. Alternatively, by setting the tracking target object 4, the first region image 751a may be displayed. As shown in (C) of FIG. 28, when the person 3 approaches the first region image 751a, a first moving image 760 shown in FIG. 29 is displayed and switching between the images is started.

As shown in FIG. 29, the first moving image 760 in which the first region image 751a is rotated and faces the front is generated and displayed. At this time, the first moving image 760 is generated such that the first region image 751a is displayed in the entire screen. Then, a second image 412b as shown in (D) of FIG. 28 is displayed and switching between the images is terminated.

As in this embodiment, an entire second image 712b is set as a second region 750b. Further, first and second regions 750a and 750b are set as the common region. Thus, as shown in FIG. 29, the first moving image 760 in which the first region image 751a is moved to a position of the entire screen that is a position of the second region 750b is displayed. In switching to the first image 712a, a second moving image in which the entire second image 712b as a second region image 751b is moved to a position of a first region 750a is displayed. In this manner, the entire captured image may be set as the first region or the second region.

Further, in this embodiment, as the first region image 751a, an image in which the second image 712b is embedded is used. Using the image as a switching destination in this manner, the first region image may be generated. With this, it becomes easy to understand a spatial positional relationship between the first and second images.

Switching between the images may be performed according to an instruction of the user. For example, according to an instruction to select the first region image displayed in the first image, the first moving image may be output and switching to the second image may be performed. Similarly, according to an instruction to select the second region image displayed in the second image, the second moving image may be output and switching to the first image may be performed.

For example, as shown in FIG. 21, it is assumed that a plurality of first region images are displayed in the first image. In such a case, for example, by appropriately selecting the first region image, switching between the images associated with the selected first region image can be performed. With this, it becomes possible to intuitively perform switching to an image to be monitored.

As another example of this operation, for example, it is assumed that security is set in a door in the monitoring screen shown in FIG. 3. Further, it is assumed that a suspicious person who hides behind a person who has opened the door using a card or the like, and illegally enters the building is found. In such a case, a monitoring person (user) appropriately selects the first and second region images in the building according to a motion of the suspicious person. If a touch panel or the like is used, the first and second region images are touched according to the motion of the suspicious person. According to the operation, the first and second moving images are displayed and switching between the images is appropriately performed. In this manner, switching between the images may be performed according to an instruction of a touch operation or the like. With this, it becomes possible to perform tracking without loosing the suspicious person and it is possible to perform monitoring at high accuracy.

Note that the display of the first and second moving images may be skipped according to an instruction of the user. For example, while the first and second moving images are displayed, a touch operation or the like is input into a predetermined or any region in the screen. Then, the display of the first and second moving images may be skipped and the image as the switching destination may be displayed. With this, a speed for switching between the images can be increased. For example, it is effective in the case where the suspicious person or the like moves at high speed, for example.

In the above, the first region image is displayed in the first image when the tracking target object approaches within the predetermined distance. However, the first region image may be displayed in the first image. When switching is started and the switching moving image is displayed, the first region image may be displayed. The same is applied to the second region image.

As the switching moving image reflecting the positional relevance between the first and second imaging spaces, a moving image different from the first and second moving images using the first and second region images may be generated. For example, an image in which only the ground is emphasized is appropriately rotated or moved, for example, and a moving image representing a relative positional relationship between the images may be generated.

A case where the pan/tilt operation or the like is performed in the imaging space will be described. In this case, a plurality of different first images are captured by a single first camera. Further, a plurality of different first images are captured by a single second camera.

For example, for first and second images captured in an imaging setting as a reference, first and second regions are set. Based on position information on the first and second regions as the reference and imaging setting information on a pan/tilt setting or the like, first and second regions are set for first and second images captured in another imaging setting.

Alternatively, the first and second regions set in the first and second images as the reference may be, as they are, set for the first and second images captured in the other imaging setting. Then, the same switching moving image may be displayed. Also in this manner, it is possible to know a spatial positional relationship between the first and second images.

Alternatively, in a plurality of imaging settings, the first and second regions may be set in advance. Based on information on the first and second regions in the plurality of imaging settings, the first and second regions may be performed in the other imaging setting.

In the above, a client apparatus and a server apparatus are connected via the network and the server apparatus and the plurality of cameras are connected via the network. However, the networks do not need to be used for connecting the apparatuses. That is, a method of connecting the apparatuses is not limited. Further, in the above, the client apparatus and the server apparatus are arranged as separate apparatuses. However, the client apparatus and the server apparatus may be integrally configured and used as an information processing apparatus according to an embodiment of the present technology. An information processing apparatus according to an embodiment of the present technology may be configured to include a plurality of imaging apparatuses.

The processing of switching between the images or the like according to the present technology described above may be used for an information processing system other than the monitoring camera system.

At least two features out of the features of the embodiments described above can also be combined.

Note that the present technology may also take the following configurations.

(1) An information processing apparatus, including:
an input unit that inputs
a first image that is captured by a first imaging apparatus that sets a first imaging space as an imaging target, and
a second image that is captured by a second imaging apparatus that sets a second imaging space different from the first imaging space as an imaging target and switched to/from the first image and displayed; and
a control unit that outputs, when the first and second images are switched to each other, a switching moving image reflecting positional relevance between the first and second imaging spaces.

(2) The information processing apparatus according to (1), in which
the control unit includes
a setting unit that sets a region corresponding to the positional relevance between the first and second imaging spaces as a first region in the first image and as a second region in the second image, and
a generation unit that generates a first moving image in which a first region image representing the first region is moved reflecting the positional relevance as a switching moving image to the second image, and generates a second moving image in which a second region image representing the second region is moved reflecting the positional relevance as a switching moving image to the first image.

(3) The information processing apparatus according to (2), in which
the setting unit sets a common region captured in common between the first and second images as the first region in the first image and as the second region in the second image, and
the generation unit generates a moving image in which the first region image is moved to a position of the second region in the second image as the first moving image, and generates a moving image in which the second region image is moved to a position of the first region in the first image as the second moving image.

(4) The information processing apparatus according to (2) or (3), in which
the generation unit generates a moving image in which the first region image is moved to an outside of a screen, and generates a moving image in which the second region image is moved to the outside of the screen as the second moving image.

(5) The information processing apparatus according to any of (2) to (4), further including
a tracking unit that tracks an object as a tracking target in the first and second images, in which
the control unit outputs the first moving image when a distance between the object as the tracking target and the first region becomes smaller than a predetermined value, and outputs the second moving image when a distance between the object as the tracking target and the second region becomes smaller than a predetermined value.

(6) The information processing apparatus according to (5), in which
the control unit outputs the first region image into the first image when the distance between the object as the tracking target and the first region becomes smaller than the predetermined value, and outputs when the second region image into the second image the distance between the object as the tracking target and the second region becomes smaller than the predetermined value.

(7) The information processing apparatus according to any of (2) to (6), further including
an instruction input unit that inputs an instruction from a user, in which
the control unit outputs the first moving image according to an instruction to select the first region image input via the instruction input unit, and outputs the second moving image according to an instruction to select the second region image input via the input unit.

DESCRIPTION OF SYMBOLS 4 tracking target object
10 camera
10a, 510a first camera
10b, 510b second camera
11 imaging space
11a, 511a first imaging space
11b, 511b second imaging space
12 captured image
12a, 112a, 212a, 312a, 412a, 512a, 712a first image
12b, 112b, 212b, 312b, 412b, 512b, 712b second image
15 screen
20 server apparatus
23 image analysis unit
24 switching control unit
30 client apparatus
50a, 150a, 250a, 350a, 550a, 750a first region
50b, 150b, 250b, 350b, 550b, 750b second region
51a, 151a, 251a, 351a, 381, 451a, 551a, 751a first region image
51b, 151b, 251b, 351b, 551b, 751b second region image
52, 152 common region
60, 160, 260, 360, 560, 760 first moving image
65, 565 second moving image
100 monitoring camera system
600 computer That invention claimed is:

1. An information processing apparatus, comprising:
one or more processors configured to:
acquire a first image from a first imaging apparatus,
wherein the first imaging apparatus captures the first image with a first imaging space set as a first imaging target;
acquire a second image from a second imaging apparatus,
wherein the second imaging apparatus captures the second image with a second imaging space set as a second imaging target, and
wherein the first imaging space comprises a first non-common region that is excluded in the second image, and the second imaging space comprises a second non-common region that is excluded in the first imaging space;
switch, on a display screen, between display of the first image and the second image based on one of a first position of an object in the first imaging space or a second position of the object in the second imaging space;
generate a switching moving image based on the switch between the display of the first image and the second image,
wherein the switching moving image corresponds to a positional relevance between the first imaging space and the second imaging space; and
control the display screen to output the switching moving image.

2. The information processing apparatus according to claim 1, wherein the one or more processors are further configured to:
  determine a first region in the first image and a second region in the second image based on the positional relevance between the first imaging space and the second imaging space;
  generate a first moving image as the switching moving image, wherein the first moving image includes a first region image,
  wherein the first region image represents a first change of the first region to the second region; and
  generate a second moving image as the switching moving image, wherein the second moving image includes a second region image,
  wherein the second region image represents a second change of the second region to the first region.

3. The information processing apparatus according to claim 2, wherein one or more processors are further configured to:
  set a common region as the first region in the first image and as the second region in the second image, wherein the common region is a region that is common between the first image and the second image;
  generate the first moving image in which a first display of the first region image is changed to correspond to a third position of the second region in the second image; and
  generate the second moving image in which a second display of the second region image is changed to correspond to a fourth position of the first region in the first image.

4. The information processing apparatus according to claim 2, wherein the one or more processors are configured to:
  generate the first moving image in which at least a first portion of the first region image is outside the display screen; and
  generate the second moving image in which at least a second portion of the second region image is outside the display screen.

5. The information processing apparatus according to claim 2, wherein the one or more processors are further configured to:
  track the object as a tracking target in each of the first image and the second image;
  output the first moving image based on a first distance between the tracking target and the first region, wherein the first distance is smaller than a value; and
  output the second moving image based on a second distance between the tracking target and the second region, wherein the second distance is smaller than the value.

6. The information processing apparatus according to claim 5, wherein one or more processors are further configured to:
  control the display screen to display the first region image in the first image based on the first distance; and
  control the display screen to display the second region image in the second image based on the second distance.

7. An information processing method, comprising:
  in an information processing apparatus:
    acquiring a first image from a first imaging apparatus, wherein the first imaging apparatus captures the first image with a first imaging space set as a first imaging target;
    acquiring a second image from a second imaging apparatus,
    wherein the second imaging apparatus captures the second image with a second imaging space set as a second imaging target, and
    wherein the first imaging space comprises a first non-common region that is excluded in the second image, and the second imaging space comprises a second non-common region that is excluded in the first imaging space;
    switching, on a display screen, between display of the first image and the second image based on one of a first position of an object in the first imaging space or a second position of the object in the second imaging space;
    generating a switching moving image based on the switch between the display of the first image and the second image,
    wherein the switching moving image corresponds to a positional relevance between the first imaging space and the second imaging space; and
    controlling the display screen to output the switching moving image.

8. A non-transitory computer-readable medium having stored thereon, computer-executable instructions which when executed by an information processing apparatus cause the information processing apparatus to execute operations, the operations comprising:
  acquiring a first image from a first imaging apparatus,
  wherein the first imaging apparatus captures the first image with a first imaging space set as a first imaging target;
  acquiring a second image from a second imaging apparatus,
  wherein the second imaging apparatus captures the second image with a second imaging space set as a second imaging target, and
  wherein the first imaging space comprises a first non-common region that is excluded in the second image, and the second imaging space comprises a second non-common region that is excluded in the first imaging space;
  switching, on a display screen, between display of the first image and the second image based on one of a first position of an object in the first imaging space or a second position of the object in the second imaging space;
  generating a switching moving image based on the switch between the display of the first image and the second image,
  wherein the switching moving image corresponds to a positional relevance between the first imaging space and the second imaging space; and
  controlling the display screen to output the switching moving image.

9. An information processing system, comprising:
  a display screen;
  a first imaging apparatus configured to set a first imaging space as a first imaging target;
  a second imaging apparatus configured to set a second imaging space as a second imaging target; and
  an information processing apparatus comprising one or more processors, wherein the one or more processors are configured to:
    acquire a first image from the first imaging apparatus, wherein the first imaging apparatus captures the first image with the first imaging target;

acquire a second image from the second imaging apparatus, wherein the second imaging apparatus captures the second image with the second imaging target, wherein the first imaging space comprises a first non-common region that is excluded in the second image, and the second imaging space comprises a second non-common region that is excluded in the first imaging space;

switch, on the display screen, between display of the first image and the second image based on one of a first position of an object in the first imaging space or a second position of the object in the second imaging space;

generate a switching moving image based on the switch between the display of the first image and the second image, wherein the switching moving image corresponds to a positional relevance between the first imaging space and the second imaging space; and control the display screen to output the switching moving image.

\* \* \* \* \*